United States Patent
Tseitlin et al.

(10) Patent No.: US 9,063,725 B2
(45) Date of Patent: Jun. 23, 2015

(54) PORTABLE MANAGEMENT

(75) Inventors: Ariel D. Tseitlin, Sunnyvale, CA (US);
Daniel Kearns, Moss Beach, CA (US);
William B. Kilgore, Tempe, AZ (US)

(73) Assignee: Oracle International Corporation,
Redwood Shores, CA (US)

( * ) Notice: Subject to any disclaimer, the term of this patent is extended or adjusted under 35 U.S.C. 154(b) by 1390 days.

(21) Appl. No.: 11/426,248

(22) Filed: Jun. 23, 2006

(65) Prior Publication Data

US 2007/0260629 A1 Nov. 8, 2007

Related U.S. Application Data

(60) Provisional application No. 60/693,623, filed on Jun. 24, 2005.

(51) Int. Cl.
*G06F 9/44* (2006.01)
*G06F 9/445* (2006.01)

(52) U.S. Cl.
CPC .. *G06F 8/31* (2013.01); *G06F 8/20* (2013.01); *G06F 8/60* (2013.01)

(58) Field of Classification Search
CPC .................................... G06F 8/20; G06F 8/31
USPC .......................................................... 717/137
See application file for complete search history.

(56) References Cited

U.S. PATENT DOCUMENTS

| | | | |
|---|---|---|---|
| 5,067,072 A | 11/1991 | Talati et al. | 717/148 |
| 5,175,856 A | 12/1992 | Van Dyke et al. | 717/151 |
| 5,179,703 A * | 1/1993 | Evans | 717/122 |
| 5,339,430 A | 8/1994 | Lundin et al. | 717/170 |
| 5,432,937 A | 7/1995 | Tevanian et al. | 717/162 |
| 5,583,983 A * | 12/1996 | Schmitter | 717/138 |
| 5,625,804 A | 4/1997 | Cooper et al. | 717/170 |
| 5,644,771 A | 7/1997 | Endicott et al. | 717/170 |
| 5,826,265 A | 10/1998 | Van Huben et al. | 707/E17.005 |
| 5,920,867 A | 7/1999 | Van Huben et al. | 707/E17.007 |
| 5,943,674 A * | 8/1999 | Schofield | 717/140 |
| 6,018,627 A | 1/2000 | Iyengar | 717/103 |
| 6,066,181 A | 5/2000 | DeMaster | 717/148 |
| 6,074,432 A | 6/2000 | Guccione | 717/163 |
| 6,151,643 A | 11/2000 | Cheng et al. | 709/200 |
| 6,154,878 A | 11/2000 | Saboff | 717/173 |
| 6,199,195 B1 * | 3/2001 | Goodwin et al. | 717/108 |
| 6,286,134 B1 | 9/2001 | Click et al. | 717/138 |
| 6,330,569 B1 | 12/2001 | Baisley et al. | 717/168 |
| 6,408,311 B1 | 6/2002 | Baisley et al. | 707/999.203 |
| 6,442,752 B1 | 8/2002 | Jennings et al. | 717/162 |

(Continued)

OTHER PUBLICATIONS

Polze, Andreas, "Component Programming with J2EE and .NET."; Feb. 27, 2004, Discourse lectures at the Berlin Distributed Computing Laboratory, Downloaded from http://user.cs.tu-berlin.de/~mwerner/discourse/BlockLVS04/slides/Components.pdf on Jun. 14, 2004; pp. 1-10.

(Continued)

*Primary Examiner* — Don Wong
*Assistant Examiner* — Theodore Hebert
(74) *Attorney, Agent, or Firm* — Campbell Stephenson LLP

(57) ABSTRACT

A method is provided. The method composes management code in a platform independent managed object format. Further, the management code is utilized to manage at least one object. In addition, the management code transforms the management code into a plurality of portable management objects and a plurality of native management objects.

25 Claims, 20 Drawing Sheets

(56) References Cited

U.S. PATENT DOCUMENTS

| | | | |
|---|---|---|---|
| 6,473,748 B1 | 10/2002 | Archer | 706/45 |
| 6,477,434 B1 | 11/2002 | Wewalaarachchi et al. | 700/83 |
| 6,571,140 B1 | 5/2003 | Wewalaarachchi et al. | 700/83 |
| 6,584,507 B1 | 6/2003 | Bradley et al. | 709/223 |
| 6,738,967 B1 | 5/2004 | Radigan | 717/146 |
| 6,738,975 B1 | 5/2004 | Yee et al. | 719/310 |
| 6,757,893 B1 | 6/2004 | Haikin | 717/170 |
| 6,865,733 B2 | 3/2005 | Broussard | 704/200 |
| 6,915,513 B2 | 7/2005 | Duesterwald et al. | 717/169 |
| 6,971,090 B1* | 11/2005 | Gruttadauria et al. | 717/136 |
| 7,003,783 B2 | 2/2006 | Skaringer et al. | 719/332 |
| 7,051,324 B2* | 5/2006 | Gissel et al. | 717/166 |
| 7,076,765 B1 | 7/2006 | Omori | 717/165 |
| 7,225,240 B1* | 5/2007 | Fox et al. | 709/223 |
| 7,234,111 B2 | 6/2007 | Chu et al. | 715/251 |
| 7,293,261 B1* | 11/2007 | Anderson et al. | 717/137 |
| 7,293,262 B2* | 11/2007 | Sengodan | 717/136 |
| 7,305,669 B2* | 12/2007 | Roush | 717/170 |
| 7,313,782 B2 | 12/2007 | Lurie et al. | 717/168 |
| 7,340,718 B2 | 3/2008 | Szladovics et al. | 717/106 |
| 7,434,213 B1* | 10/2008 | Prakash et al. | 717/152 |
| 7,444,625 B2 | 10/2008 | Anwar et al. | 717/140 |
| 7,458,073 B1 | 11/2008 | Darling et al. | 707/168 |
| 7,562,358 B2* | 7/2009 | Bennett et al. | 717/170 |
| 7,610,316 B2 | 10/2009 | Bartz et al. | 717/170 |
| 7,770,158 B2 | 8/2010 | Osborne et al. | 717/116 |
| 7,779,405 B2 | 8/2010 | Gorti | 717/172 |
| 7,886,108 B2 | 2/2011 | Tseitlin et al. | 709/217 |
| 8,332,830 B2 | 12/2012 | Kantorowitz et al. | 717/148 |
| 8,635,595 B2* | 1/2014 | Melillo | 717/120 |
| 2002/0107995 A1 | 8/2002 | Skaringer et al. | 717/173 |
| 2002/0116698 A1 | 8/2002 | Lurie et al. | 717/100 |
| 2003/0101431 A1 | 5/2003 | Duesterwald et al. | 717/126 |
| 2003/0221190 A1 | 11/2003 | Deshpande et al. | 717/171 |
| 2003/0233631 A1 | 12/2003 | Curry et al. | 717/100 |
| 2004/0015816 A1 | 1/2004 | Hines et al. | 717/101 |
| 2004/0143826 A1* | 7/2004 | Gissel et al. | 717/162 |
| 2004/0181779 A1* | 9/2004 | Gorti | 717/120 |
| 2004/0187140 A1 | 9/2004 | Aigner et al. | 719/328 |
| 2004/0216133 A1 | 10/2004 | Roush | 719/316 |
| 2004/0223009 A1 | 11/2004 | Szladovics et al. | 345/760 |
| 2005/0034137 A1 | 2/2005 | Bartz et al. | 719/328 |
| 2005/0037735 A1 | 2/2005 | Coutts | 455/411 |
| 2005/0097543 A1 | 5/2005 | Hirayama | 717/168 |
| 2005/0160104 A1 | 7/2005 | Meera et al. | 707/100 |
| 2005/0240558 A1 | 10/2005 | Gil et al. | 707/1 |
| 2006/0031827 A1 | 2/2006 | Barfield et al. | 717/168 |
| 2006/0075398 A1 | 4/2006 | Bennett et al. | 717/170 |
| 2006/0080682 A1 | 4/2006 | Anwar et al. | 719/331 |
| 2006/0101429 A1 | 5/2006 | Osborne et al. | 717/137 |
| 2006/0117298 A1 | 6/2006 | Delapedraja et al. | 717/120 |
| 2006/0184980 A1 | 8/2006 | Cole | 725/100 |
| 2007/0022404 A1* | 1/2007 | Zhang et al. | 717/103 |
| 2007/0226682 A1* | 9/2007 | Kilgore et al. | 717/106 |
| 2007/0250575 A1* | 10/2007 | Tseitlin et al. | 709/205 |
| 2007/0260629 A1* | 11/2007 | Tseitlin et al. | 707/102 |
| 2009/0279556 A1* | 11/2009 | Selitser et al. | 370/401 |
| 2010/0299590 A1* | 11/2010 | Gissler et al. | 715/239 |
| 2013/0219370 A1* | 8/2013 | Beale et al. | 717/128 |

OTHER PUBLICATIONS

Moore, Bill, et al., "Migrating WebLogic Applications to WebSphere Advanced Edition," IBM Redbooks, Jan. 2001, pp. 17-31.

Gregory, Kate, "Microsoft® Visual C++®.NET 2003," Dec. 2003, Sams Publishing, pp. 92-108.

SGI, Building Software for Multiple Architectures, Silicon Graphics International Corp. (Jul. 21, 1994) retrieved from http://techpubs.sgi.com/library/tpl/cgi-bin/getdoc.cgi?coll=0620&&db=bks&srch=&fname=/SGI_End User/C1rC_UG/sgi_hmtl/ch14.html on May 28, 2014, pp. 3.

IBM; "IBM Terminology—Terms E". Retrieved from http://www-01.ibm.com/software/globalization/terminology/e.htm. on Sep. 2, 2011; pp. 1, 22, 55, and 56.

Delorie Softare, 2.1, Command Line Options, delore.com (Jun. 2003) retrieved from http://www.delore.com/gnu/docs/binutils/ID_3.html on Sep. 27, 2014.

* cited by examiner

PORTABLE MANAGEMENT

RELATED APPLICATION

This application claims the benefit of and priority to U.S. Provisional Application Ser. No. 60/693,623, filed Jun. 24, 2005, the contents of which are incorporated by reference herein in its entirety.

BACKGROUND

1. Field

A method and system are disclosed which generally relate to computer application environments.

2. General Background

Computer systems form the backbone of modern business. Computer systems are used in virtually every step of a business chain. For example, computer systems are used to purchase source materials, track production, monitor inventory levels, monitor quality, set pricing, maintain customer relationships, provide accounting services, maintain a payroll, provide employee benefits, track inbound/outbound shipments, track customer satisfaction or complaints, and perform countless other tasks to run a business.

A number of enterprise software applications have been created to allow a business to perform many of these business support functions with a single integrated software application. These enterprise software applications have provided the businesses that employ these applications with a competitive advantage. However, such enterprise software applications tend to be expansive applications that require significant computer resources to run and knowledgeable technicians to maintain. Furthermore, enterprise software applications tend to be expensive programs to purchase or lease. Thus, enterprise software applications have mainly been used only by very large corporations that are able to afford such infrastructure investments and continue to pay for their continued use.

Even very large corporations can have some difficulties with large enterprise software applications. For example, a large corporation may already have a legacy software application that the large corporation wishes to continue using. Thus, integrating the legacy software application with a new enterprise software application can be difficult and require very skilled application integrators.

Furthermore, corporations in different business segments often have very different needs from their enterprise software applications. Therefore, a corporation using with a "one-size-fits-all" enterprise software application may find that the "one-size-fits-all" enterprise software includes many unnecessary features. These unnecessary features needlessly cost the corporation money and consume valuable computer resources. The enterprise software application may also be missing a number of desired industry-specific features for each different corporation. These corporations must develop these missing features internally or find another software application that provides the needed features. If an additional software application that provides the missing features is located, then the corporation must integrate that additional application with the enterprise software application.

Due to these difficulties with large enterprise software applications, it would be desirable to find a way to make such enterprise software applications more flexible. Specifically, it would be desirable to allow small businesses to be able to afford some of the features provided by enterprise software applications. Similarly, it would be desirable to allow large corporations to easily select and install only the needed features. And finally, it would be desirable to have an ability to easily integrate the enterprise software application with other customized applications.

SUMMARY

In one aspect of the disclosure, a method is provided. The method composes management code in a platform independent managed object format. Further, the management code is utilized to manage at least one object. In addition, the management code transforms the management code into a plurality of portable management objects and a plurality of native management objects.

In yet another aspect of the disclosure, a system is provided. The system has a unit that composes management code in a platform independent managed object format. Further, the system has a unit that transforms the management code into a plurality of portable management objects and a plurality of native management objects. In addition, the system has a unit that assigns at least one console function to each of the portable management objects and native management objects.

In yet another aspect of the disclosure, a machine readable medium has stored thereon a set of instructions which when executed perform a method. The method composes management code in a platform independent managed object format. The management code is utilized to manage at least one object. Further, the method transforms the management code into a plurality of portable management objects.

BRIEF DESCRIPTION OF DRAWINGS

The above-mentioned features and objects of the present disclosure will become more apparent with reference to the following description taken in conjunction with the accompanying drawings wherein like reference numerals denote like elements and in which.

DETAILED DESCRIPTION

A method and apparatus for implementing a portable and open standards-based business application platform are disclosed. In the following description, for purposes of explanation, specific nomenclature is set forth to provide a thorough understanding of the present disclosure. However, it will be apparent to one skilled in the art that these specific details are not required in order to practice the method and apparatus disclosed herein. For example, although reference is made to the J2EE and .Net application platforms, the same techniques can easily be applied to other types of application platforms.

Certain computer application tasks require very large and complex computer software applications. For example, running an entire business operation requires a very large application (an "enterprise application") that can handle many different tasks. Providing such large and complex enterprise software applications to a customer can be a great challenge to the enterprise software application developer.

Monolithic Application Executing at Customer Site

Figure 1:
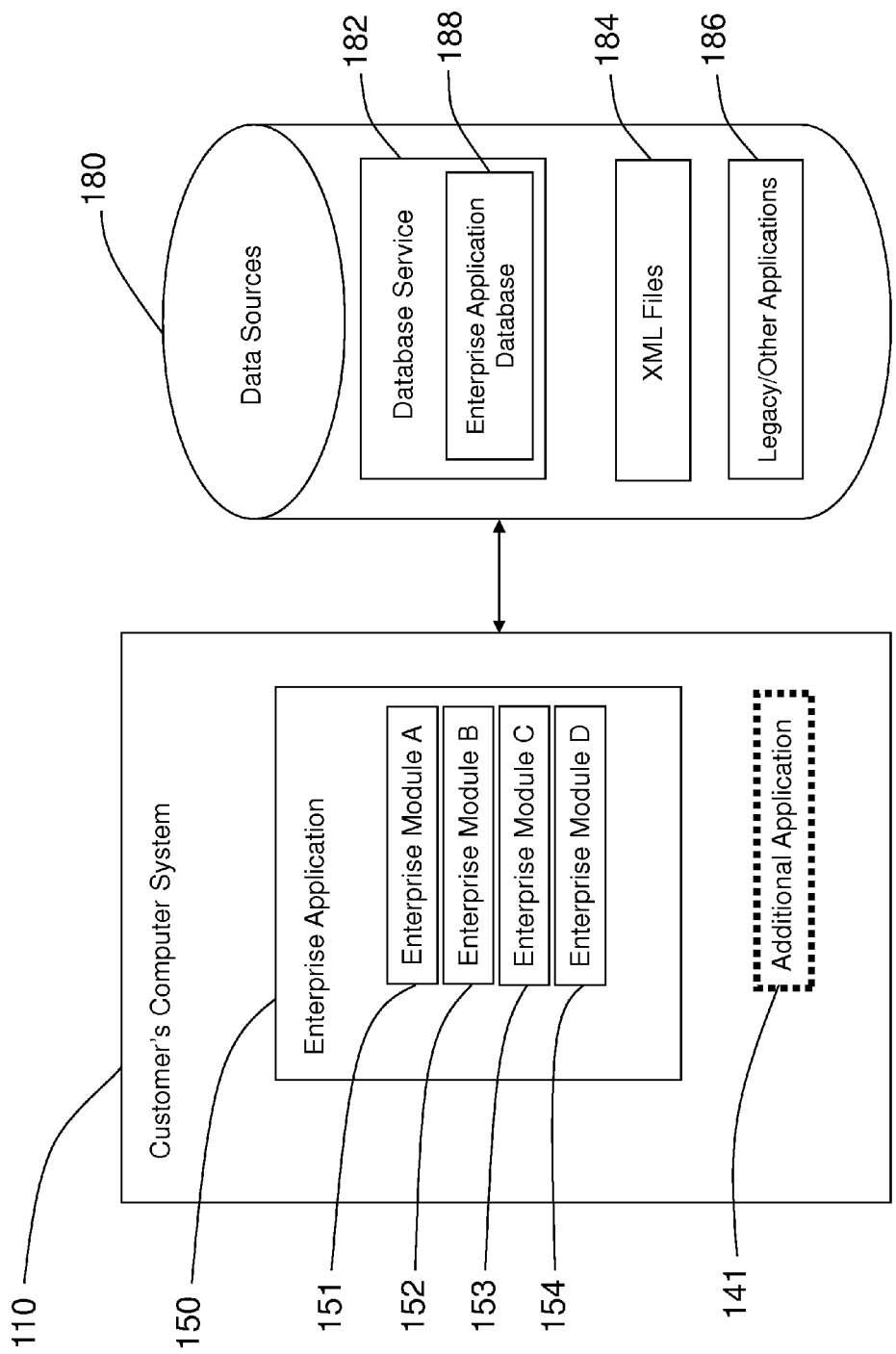
FIG. 1 illustrates infrastructure utilized in a large and complex application, such as an enterprise application.

FIG. 1 illustrates infrastructure utilized in a large and complex application, such as an enterprise application. The infrastructure can be provided to the client by installing the enterprise application onto computers owned by the customer at the customer's premises. For instance, an enterprise application 150 can be installed to run on a customer's computer system 110. The enterprise application 150 may use data and/or services from the data sources 180, which include a database service 182, XML files 184, and legacy/other applications 186. Further, the database service 182 stores an enterprise application database 188.

The enterprise application 150 can be an expensive application, to purchase or lease, which utilizes significant computer resources. Further, installing and maintaining the enterprise software application 150 may require knowledgeable technicians. Thus, a smaller business might not want to use the large and complex enterprise application 150.

Even large corporations with significant computer resources and budgets may have difficulties with the large enterprise application. For example, a large corporation may already have a legacy software application that the corporation wishes to continue using. Thus, integrating the legacy software application with a new enterprise application 150 can be difficult and require very skilled application integrators.

The enterprise application 150 can include a variety of components, which form the building blocks of the enterprise application 150. An example of a component is a module, which is a collection of computer code that can be written to provide a service.

The enterprise application 150 may consist of many different individual modules. For example, as illustrated in FIG. 1, the enterprise module 150 can be composed of four individual enterprise modules: enterprise module A 151, enterprise module B 152, enterprise module C 153, and enterprise module D 154. A customer may need some of the enterprise modules while not needing others. For instance, a corporation may have use for the enterprise module A 151 and the enterprise module B 152, but may have no use for the enterprise module C 153 and the enterprise module D 154. Further, the corporation may need an additional module that is not provided in the enterprise application 150. In those situations, the customer develops internally or purchases an additional application 141 that provides the features of the additional module. If an additional application 141 that provides the missing features is located, then the corporation must integrate that additional application 141 with the enterprise application 150. FIG. 1 illustrates the additional application 141 being integrated with the enterprise application 150. Such development is expensive because technical skills are needed to locate or develop the additional application 141 and then integrate the additional application 141 with the enterprise application 150. Accordingly, the corporation may not find the "one-size-fits-all" enterprise application 150 to be an optimal solution for its needs.

On-line or Hosted Application Services

Figure 2:
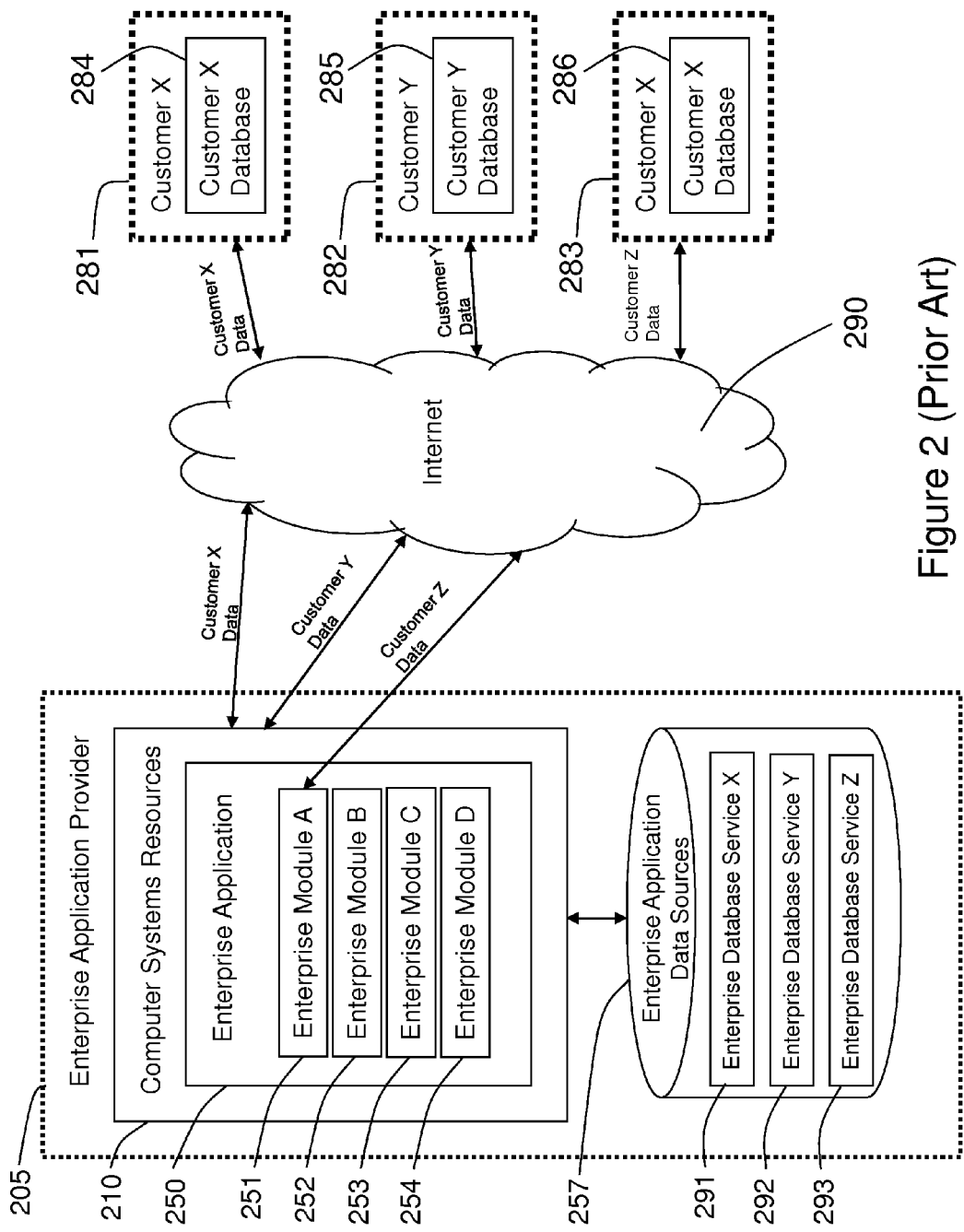
FIG. 2 illustrates an on-line or hosted infrastructure that can be utilized to provide an enterprise application over the Internet.

As an alternative to the monolithic enterprise software applications discussed above, enterprise application services can be provided to customers over the Internet. FIG. 2 illustrates an on-line or hosted infrastructure that can be utilized to provide an enterprise application 250 over the Internet 290. Specifically, an enterprise application provider 205 hosts the enterprise application 250 on a server and allows customers to access the server on-line. The server can be located at the enterprise application provider's facility. The enterprise application 250 mainly uses computer system resources 210 provided by the enterprise application provider 205. Enterprise application 250 includes enterprise module A 251, enterprise module B 252, enterprise module C 253, and enterprise module D 254. Customers such as customer X 281, customer Y 282, and customer Z 283 can access the enterprise application 250 over the Internet 290. Each of the customers can have a database. For instance, the customer X 281 may have a customer X database 284, the customer Y 282 may have a customer Y database 285, and the customer Z 283 may have a customer Z database 286. The enterprise application provider 205 keeps track of the different customer data using different database services in the enterprise application data sources 257, such as enterprise database service X 291 for customer X 281, enterprise database service Y 292 for customer Y 282, and enterprise database service Z 293 for customer Z 283.

Accordingly, the infrastructure of FIG. 2 allows small businesses to enjoy enterprise application services without needing to install and maintain a large enterprise application. Customers can access, and pay for, only portions of the enterprise application 250. For example, the customers X 281 and Y 282 send and receive data to and from all of the computer resources 210, thereby accessing the entire enterprise application 250 and all the enterprise modules, while customer Z 283 sends and receives data to and from only the enterprise module C 253, thereby accessing only enterprise application module C 253.

Enterprise Module Assembly of Enterprise Application Services

A customer that prioritizes having the enterprise application 150 on the customer's premises may purchase the "onesize-fits-all" enterprise application 150 of FIG. 1. Further, a customer that prioritizes maintaining low costs, e.g., a small business, may purchase individual modules of the enterprise application 250 of FIG. 2 to obtain limited enterprise application services at a lower cost than purchasing the entire "one-size-fits-all" enterprise application 150.

Figure 3:
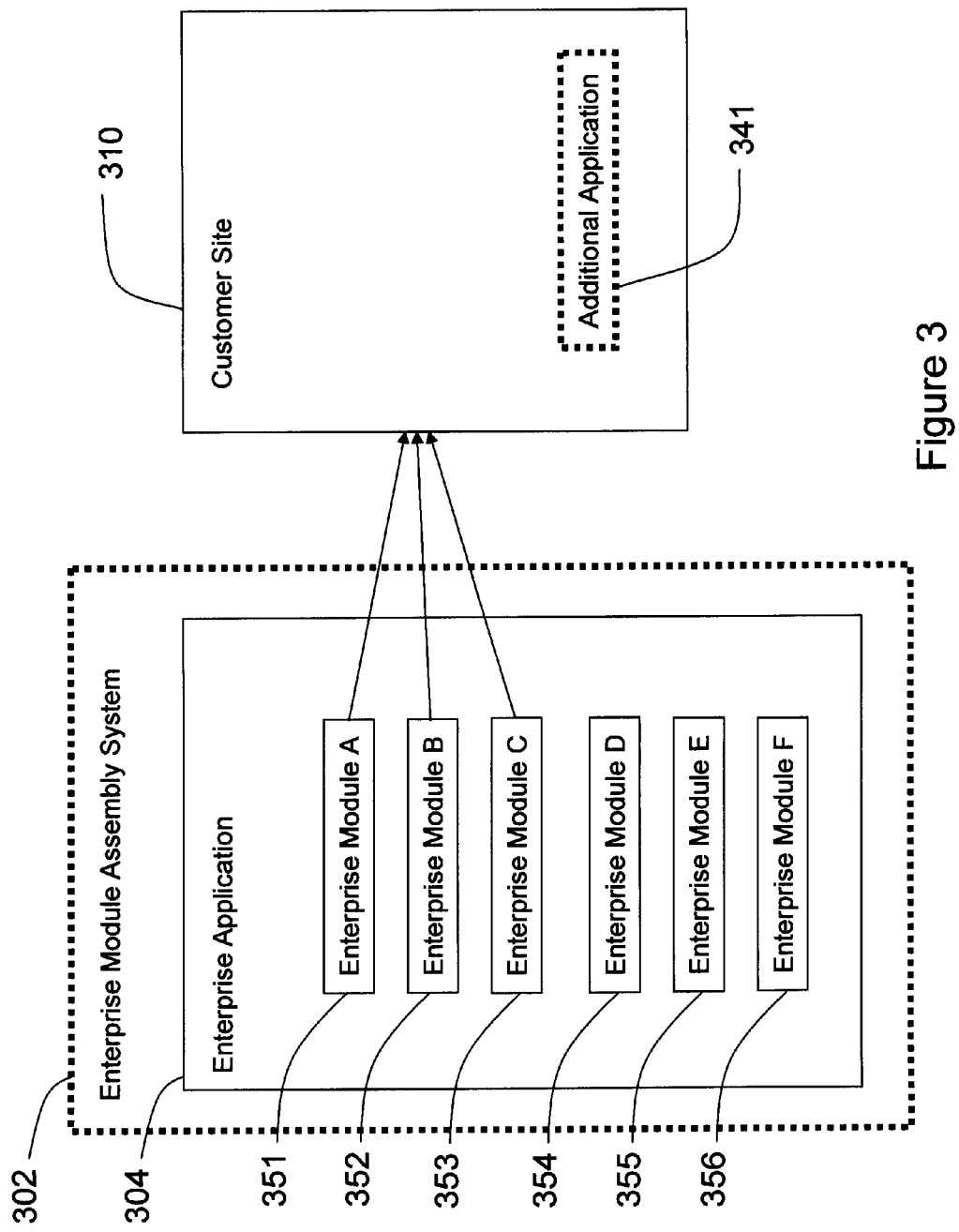
FIG. 3 illustrates an enterprise module assembly system that allows a customer to both host the enterprise application software locally and only purchase the particular modules corresponding to the services that the customer actually needs.

FIG. 3 illustrates an enterprise module assembly system 302 that allows a customer to both host the enterprise application software locally and only purchase the particular modules corresponding to the services that the customer actually needs. In addition, the enterprise module assembly system 302 allows a customer to integrate existing and/or new software on the customer's system with the enterprise modules that are purchased. Accordingly, the customer can assemble enterprise modules for particular services of an enterprise application in combination with the existing and/or new software on the customer's system.

In one embodiment, the enterprise module assembly system 302 breaks up an enterprise application 304 into individual enterprise modules. The enterprise application 304 can be a large complex computer application, e.g. an enterprise application or an even larger complex application program. The customer can then select the individual enterprise modules that the customer would like to utilize. Each of the enterprise modules can provide a different service. For instance, the enterprise application 304 may provide an enterprise module A 351 for purchasing source materials, an enterprise module B 352 for tracking production, an enterprise module C 353 for monitoring inventory levels, an enterprise module D 354 for monitoring quality, an enterprise module E 355 for setting pricing, and an enterprise module F 356 for maintaining customer relationships. The customer may then select which of these enterprise modules it would like to purchase. For instance, in FIG. 3, the customer has selected the enterprise module A, the enterprise module B, and the enterprise module C, but has not selected the enterprise module D, the enterprise module E, or the enterprise module F. The customer may not have selected the enterprise module D because the customer may already have existing software for monitoring quality. Further, the customer may not have selected the enterprise module E because, in the context of its business, the customer does not need any software for setting pricing. Finally, the customer may not have selected the enterprise module F because the customer plans on internally developing an additional application 341 for maintaining customer relationships.

The enterprise modules can be provided to the customer in a variety of ways. For instance, technicians can physically install the enterprise modules, which the customer has selected, at the customer site 310. Alternatively, the enterprise modules can be transmitted through a network, such as the Internet, to the customer site 310.

In another embodiment, the enterprise module assembly system 302 creates the enterprise modules as opposed to breaking up an existing enterprise application 304. In other words, the enterprise module assembly system 302 can create a collection of enterprise modules, each corresponding to a particular service, and allow a customer to select the enterprise modules that it would like to utilize.

Figure 4:
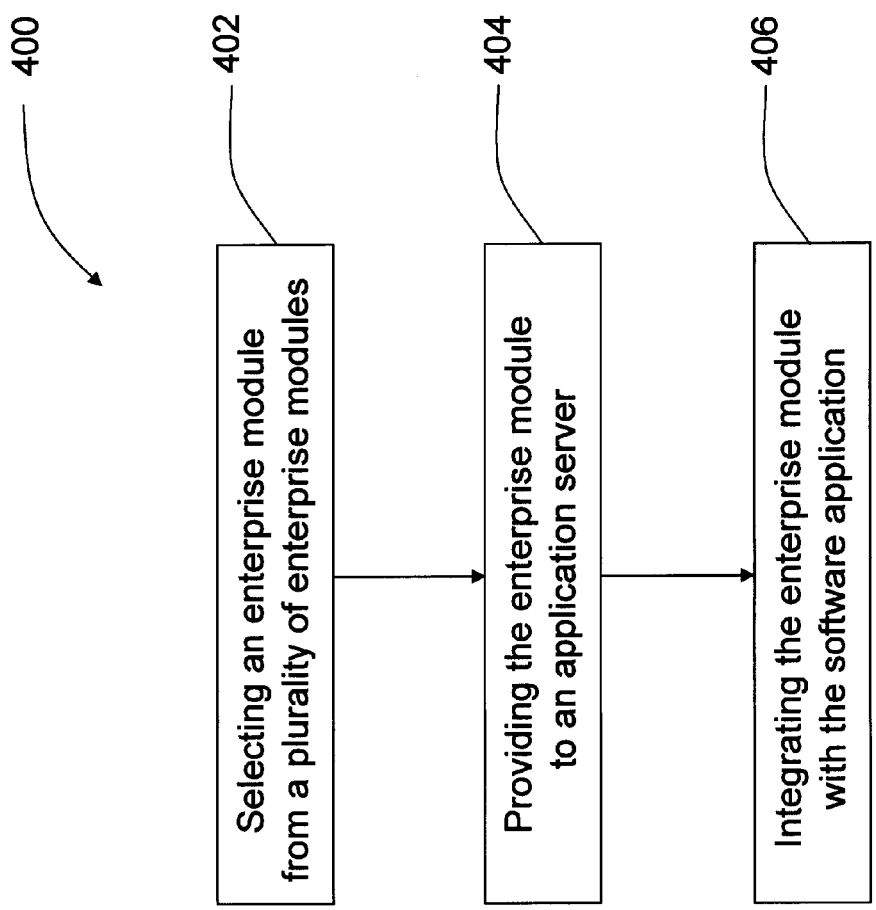
FIG. 4 illustrates a process of enhancing a computer system.

FIG. 4 illustrates a process 400 of enhancing a computer system. At a process block 402, the process 400 selects an enterprise module from a plurality of enterprise modules. The plurality of enterprise modules compose an enterprise application. Further, each of the enterprise modules includes enterprise object code generated from platform dependent source code and at least a subset of a plurality of platform dependent artifacts. As will be explained below, a developer can utilize the following to compose one of the enterprise modules: (1) high-level abstract languages to automatically generate platform dependent artifacts and (2) platform independent source code. The developer can essentially proceed with development in a portable manner because the developer can utilize a certain set of high-level abstract languages and platform independent source code irrespective of the customer's native software and hardware environment. Further, the enterprise module is developed according to an open standard because the enterprise object code is platform dependent to the specific customer's native software and hardware environment. At a process block 404, the enterprise module is provided to an application server. The application server stores a software application, which is generated from platform dependent object code. In addition, at a process block 406, the enterprise module is integrated with the software application.

Figure 5:
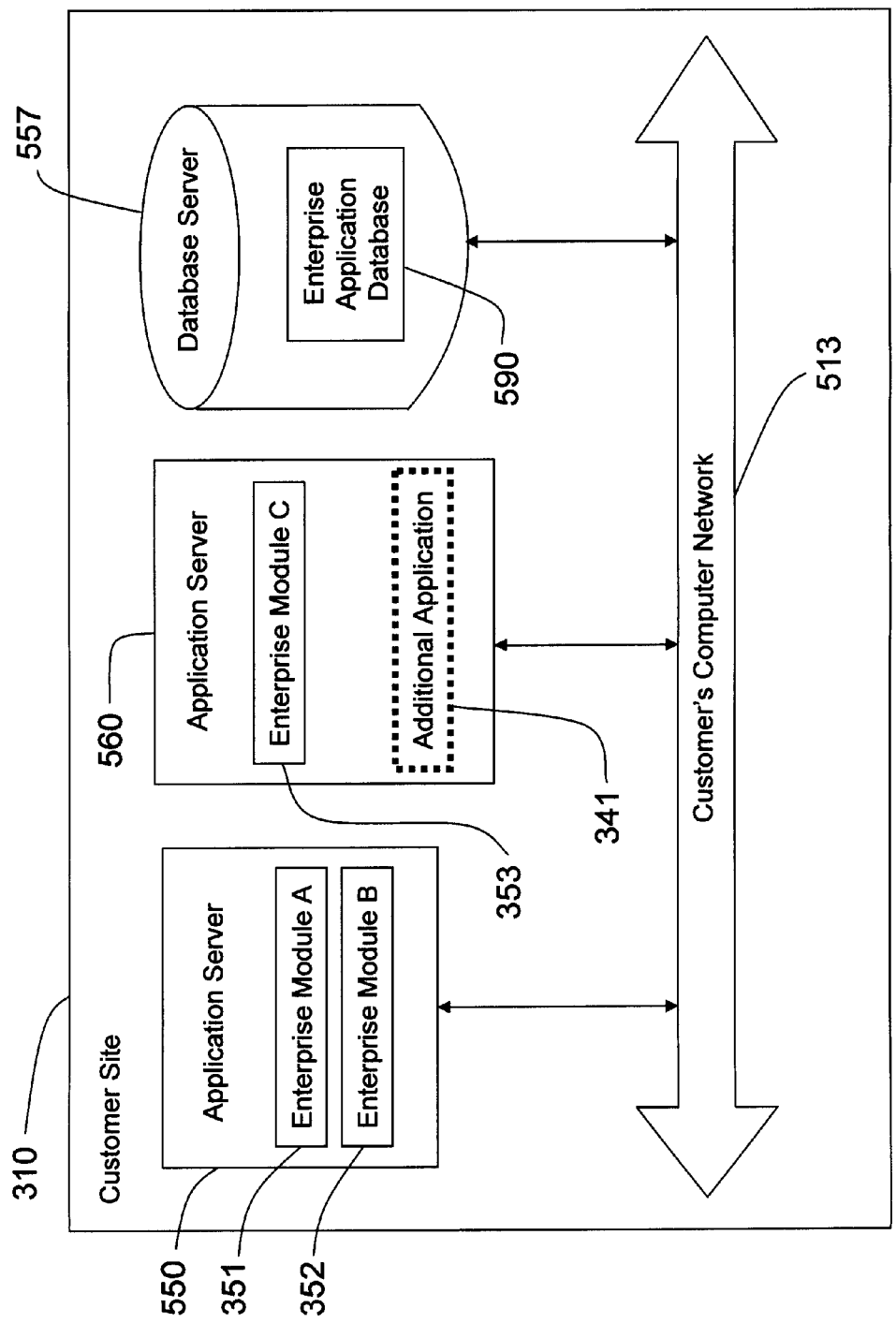
FIG. 5 illustrates an expanded view of the customer site, as seen in FIG. 3, for which the customer can implement the selected enterprise modules.

FIG. 5 illustrates an expanded view of the customer site 310, as seen in FIG. 3, for which the customer can implement the selected enterprise modules. For example, as seen in FIG. 3, the customer selects the enterprise module A, the enterprise module B, and the enterprise module C, but not the enterprise module D, the enterprise module E, or the enterprise module F. The customer may implement the selected enterprise modules on application servers, as illustrated in FIG. 5. For instance, the customer can host the enterprise module A 351 and the enterprise module B 352 on an application server 550. The application server 550 can then provide the services offered by the enterprise module A 351 and the enterprise module B 352. Further, the customer can host the enterprise module C 353 on a different application server 560. The other application server 560 may also host the additional application 341 that the customer internally developed, purchased, etc. In one embodiment, the additional application 341 includes platform dependent object code that is specific to the software and hardware at the customer site 310. While a developer composing the enterprise module C 353 was able to utilize high-level abstract languages and platform independent source code to prepare the code for the enterprise module C 353, the packaged enterprise module C 353 includes enterprise object code that is platform dependent specific to the software and hardware at the customer site 310. Since the enterprise module C 353 and the additional application 341 both include platform dependent object code compatible with the same platform, the enterprise module C 353 and the additional application 341 can be easily integrated with one another.

In addition, the customer site 310 has an enterprise application database 590 that is hosted on a database server 557. The enterprise application database 557 can store information related to each of the enterprise modules and the additional application 341 so that particular enterprise modules and/or the additional application 341 can be searched for. In addition, the customer site 310 has a computer network 513 through which the enterprise module A 351, the enterprise module B 352, the enterprise module C 353, the additional application 341, and the enterprise application database service 590 can all communicate with one another. For instance, although the enterprise module A 351 is stored on a different server than the additional application 341, the enterprise module A 351 and the additional application 341 can still communicate with one another.

Accordingly, a customer can utilize some or all of the individual enterprise modules from the enterprise application 304 (FIG. 3). The customer site 310, as illustrated in FIG. 5, can provide an open standards platform that has many tools and services for application development, application integration, and application management. Thus, a customer can easily create new application programs, e.g., the additional application 341, integrate the new application programs with the enterprise modules, and manage the enterprise modules and the new applications.

Composition of an Enterprise Module

A discussion shall now be provided regarding how an enterprise module is generated. For ease of discussion, the enterprise module A 351, as seen in FIG. 3, shall be utilized as an example of an enterprise module.

The enterprise module A 351 is constructed so that it (1) is portable and (2) utilizes an open standards platform. By being portable, the code utilized to create the enterprise module A 351 can compile and run on more than one application platform. For ease of discussion, examples shall be provided herein that utilize J2EE and .Net, which are well known platforms to one of ordinary skill in the art. However, other platforms known to one of ordinary skill in the art can easily be utilized. By being open, as discussed above, the enterprise object code included in the enterprise module A 351 is platform dependent so that the enterprise module A 351 can be easily integrated with other applications, e.g. the additional application 341 (FIG. 3), that have object code for the same platform that the customer utilizes.

Figure 6:
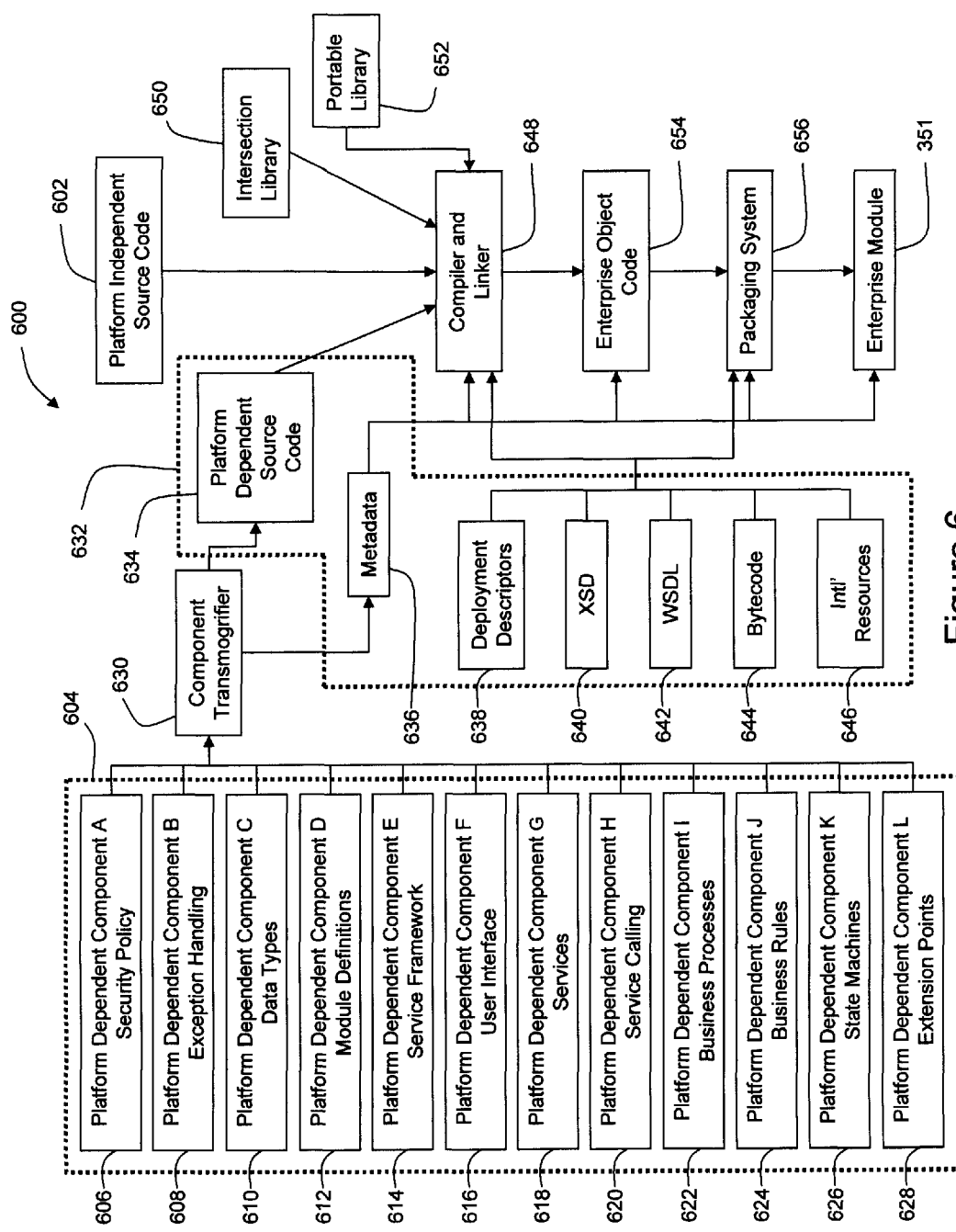
FIG. 6 illustrates an enterprise module construction system.

FIG. 6 illustrates an enterprise module construction system 600. The enterprise module construction system 600 can be utilized to construct the enterprise module A 351. The enterprise module A 351 is essentially constructed by combining platform independent source code 602 and a plurality of platform dependent components 604.

Initially, a developer determines what components of the enterprise module are platform independent and what components are platform dependent. In other words, in order for the enterprise module to eventually become native to a customer's system, some components of the enterprise module will require data specific to the individual customer's platform while other components of the enterprise module will not require data specific to the individual customer's platform.

The main algorithms utilized by the enterprise module A 351 are mostly not specific to the actual platform on which the enterprise module A 351 is being implemented. Accordingly, a large portion of these algorithms can be coded in platform independent source code 602. The platform independent source code 602 can be a subset of the syntax language of one or more platform independent languages. Accordingly, the platform independent source code 602 can be compiled on any of the compilers that support one of the platform independent languages utilized for the subsets. For instance, the platform independent source code 602 can be a subset of the syntax language for .Net and J2EE. If the function for concatenate is "concat" in both .Net and J2EE, then the subset includes the function "concat". If the compiler supports .Net, then the use of the function "concat" is accepted by the compiler. Similarly, if the compiler supports J2EE, then the use of the function "concat" is also accepted by the compiler. An example of a subset of syntax language is a subset of the Java 1.1.4 computer language. The subset can be compiled on either a .Net or J2EE compiler.

However, some services are platform specific. For instance, the security policy for the enterprise module A 351 may vary significantly from one platform to another. The high-level abstract languages provide the developer with a way of coding the plurality of platform dependent components 604 in a portable manner. In other words, the developer does not have to actually code each of the platform dependent components 604 according to the individual customer's native platform. The developer can utilize the same high-level abstract language to code a particular platform dependent component 604 for different customers with different native platforms.

FIG. 6 illustrates platform dependent component A 606 for Security Policy, platform dependent component B 608 for Exception Handling, platform dependent component C 610 for Data Types, platform dependent component D 612 for Module Definitions, platform dependent component E 614 for Service Framework, platform dependent component F 616 for User Interface, platform dependent component G 618 for Services, platform dependent component H 620 for Service Calling, platform dependent component I 622 for Business Processes, platform dependent component J 624 for Business Rules, platform dependent component K 626 for State Machines, and platform dependent component L 628 for Extension Points. These are merely examples of different platform dependent components. A subset of the platform dependent components illustrated, a combination of the platform dependent components illustrated, or completely different platform dependent components may be utilized.

An example of a developer utilizing high-level abstract languages would involve the developer utilizing XML to code the platform dependent component A 606 for Security Policy and Java to code the platform dependent component B 608 for Exception Handling. In other words, the security policy on different customer systems may be significantly different, but the developer can utilize XML to code the platform dependent component A 606 for Security Policy customers with different platforms. Further, the developer can utilize Java to code the platform dependent component B 608 for Exception Handling for different customers. While a different high-level abstract language could potentially be utilized to code each platform dependent component 604, one high-level abstract language could also be used for all of the platform dependent components 604. In addition, a set of high-level abstract languages can be utilized so that each high-level abstract language may be utilized to code more than one of the platform dependent components 604. For example, XML and Java can be utilized for the plurality of platform dependent components 604 so that half of the platform dependent components 604 are coded in XML and half of the platform dependent components 604 are coded in Java. In an alternative embodiment, some of the platform dependent components illustrated in FIG. 6 may not be native to an individual customer's platform, and the developer may choose to classify those components as platform independent components.

The enterprise module construction system 600 provides the platform dependent components 604, coded in the high-level abstract language, to a component transmogrifier 630. Further, the component transmogrifier 630 has data regarding the platform specifics of the particular customer for which the enterprise module A 351 is being developed. Accordingly, the component transmogrifier 630 can automatically convert the code written by the developer for the platform dependent components 604 into platform dependent source code 634. In other words, the developer can utilize the same high-level abstract language to generate platform dependent source code for different platforms. The developer does not have to waste the resources that would be needed to become familiar with the computer languages utilized for each customer's platform.

The component transmogrifier 630 can output a plurality of platform dependent artifacts 632. For example, the platform dependent source code 634 is a platform dependent artifact. Metadata 636 is also an example of a platform dependent artifact. The metadata 636 can be any data associated with the enterprise module A 351. For instance, the metadata 636 can provide information for a graphical user interface, such as field names. Other examples of platform dependent artifacts 632 are deployment descriptors 638, XML Schema Definition 640 ("XSD"), Web Services Description Language 642 ("WSDL"), Bytecode 644, and International resources 646. The International resources include mainly localizable artifacts, such as localized strings, dialogs, screens, etc.

Further, the plurality of platform dependent artifacts 632, such as the platform dependent source code 634, are provided to the compiler and linker 648 so that the platform dependent source code 634 can be compiled and linked with the platform independent source code 602. As a result, enterprise object code 654 is generated.

In order to help facilitate software development, the module construction system 600 provides libraries of pre-constructed code that the developer can utilize when programming in the native platform computer languages. As the module construction system 600 is portable, a developer can access pre-constructed routines for any of the native platform computer languages that are utilized. Further, an intersection library 650 includes the set of routines that is commonly available in each of the native platform computer language libraries. An intersection occurs when the same name of a function appears through each of the native computer language libraries that are being utilized. For instance, a function to change the orientation of an object may be called "reorient" in both C# and Java. Even though the underlying code for the function "reorient" may be different in C# than in Java, a compiler that supports either C# or Java can be utilized to change the orientation of the object. However, if the name of the function in C# is "reorient" and the name of the function in Java is "rotate," the two functions may be found in the portable library 652. Further, if there is a function in C# called "reorient," but no function in Java, then a function is composed in Java and placed in the portable library 652. In one embodiment, the newly written function has the same name as the corresponding function in C#. In an alternative embodiment, the newly written function has a different name than the corresponding function in C#. The intersection library 650 and the portable library 652 are provided to the compiler and linker 648 so that the routines that are called from the developer's code can be found during the compilation and linkage phase.

The enterprise object code 654 is platform specific so that the enterprise object code 654 can be run on the customer's computer network 513 (FIG. 5). Further, as illustrated in FIG. 6, the enterprise object code 654 is provided to a packaging system 656, which adds additional information to the enterprise object code 654 to generate the enterprise module A 351. Accordingly, the enterprise module A 351 can now be utilized for the specific platform at the customer site 310 and can also be seamlessly integrated with other software at the customer site 310.

Some of the platform dependent artifacts 632 are provided after the compiling and linking phase. For instance, metadata may be provided to the compiler and linker 648, the enterprise object code 654, and the packaging system 656. The metadata can include information specific to the customer's platform. Accordingly, the metadata can help compile, link, and package the code for the enterprise module A 351 so that the enterprise module A 351 can run on the customer's native platform. Further, the metadata can be provided to the enterprise module A 351 at run time so that the enterprise module A 351 can execute according to customer specific information.

In addition, the deployment descriptors 638, XSD 640, WSDL 642, Bytecode 644, and International resources 646 can also be added to the enterprise object code 654 and to the packaging system 656. These additional platform dependent artifacts may provide additional information and/or code that assists the enterprise module A 351.

Figure 7:
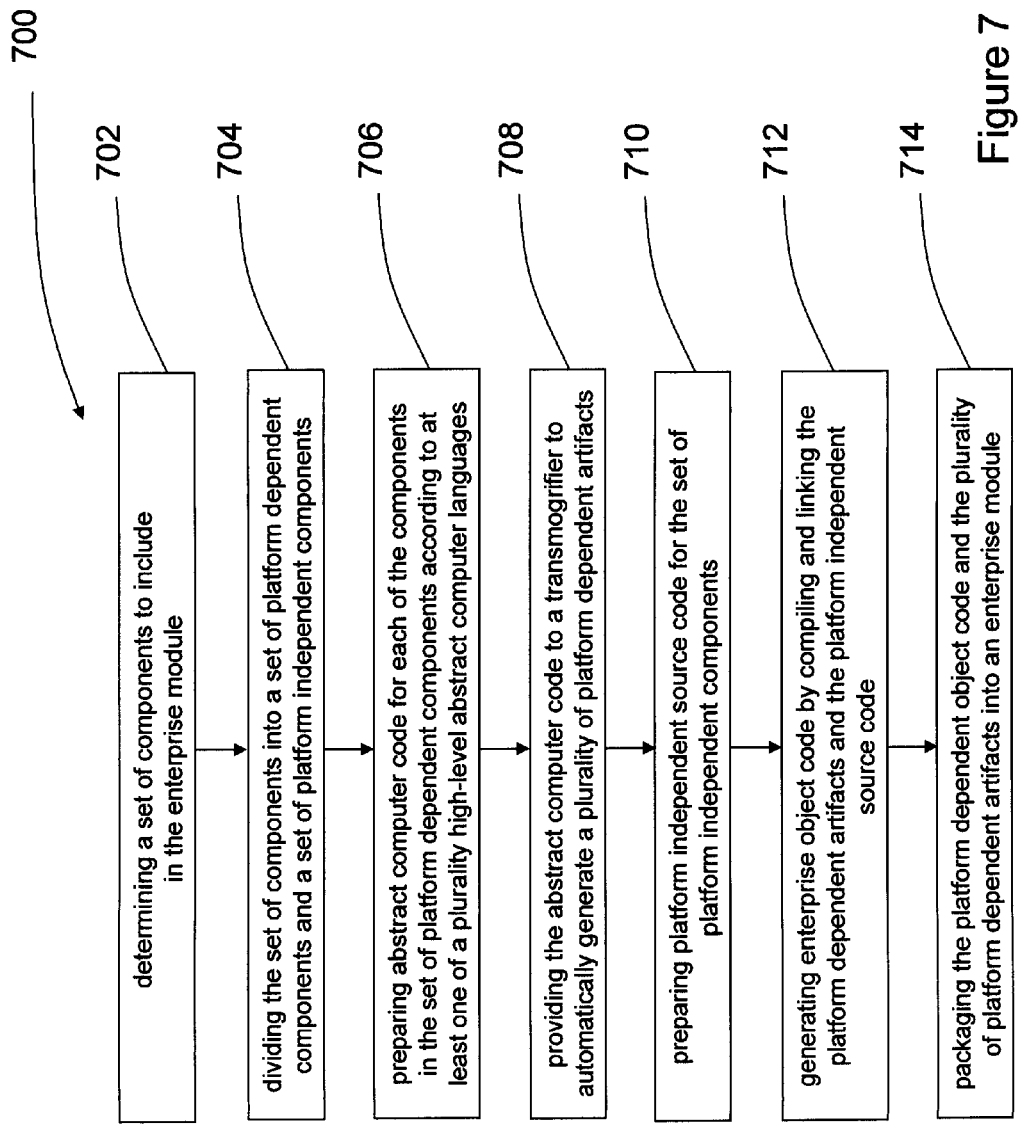
FIG. 7 illustrates a process in which the enterprise module can be generated.

FIG. 7 illustrates a process 700 in which the enterprise module A 351 can be generated. At a process block 702, a set of components to be included in the enterprise module A 351 is determined. Further, at a process block 704, the set of components is divided into a set of platform dependent components and a set of platform independent components. In addition, at a process block 706, abstract computer code is prepared for each of the components in the set of platform dependent components according to at least one of a plurality of high-level abstract computer languages. At a process block 708, the abstract computer code is provided to a transmogrifier to automatically generate a plurality of platform dependent artifacts. The plurality of platform dependent artifacts can include platform dependent source code, metadata, deployment descriptors, XSD, WSDL, Bytecode, and International resources. Further, at a process block 710, platform independent source code is prepared for the set of platform independent components. In addition, at a process block 712, enterprise object code is generated by compiling and linking the platform independent source code and at least a subset of a plurality of platform dependent artifacts. For instance, the subset of the plurality of platform dependent artifacts can include the platform dependent source code. Finally, at a process block 714, the platform dependent object code and the plurality of platform dependent artifacts are packaged into an enterprise module.

Libraries

A portability tree can be constructed to determine what code is portable and what code is non-portable. Routines for the portable code can be placed in the platform independent source code 602 while routines for the non-portable code can be placed in the portable library 652. Since a subset of platform independent languages is utilized for the platform independent code, only one routine for a particular task is placed into the platform independent source code 602. On the other hand, multiple routines for the same task may need to be placed into the portable library 652 to ensure that the same task can be performed by platform dependent code on any of the intended platforms at the customer site 310, as seen in FIG. 3.

Figure 8:
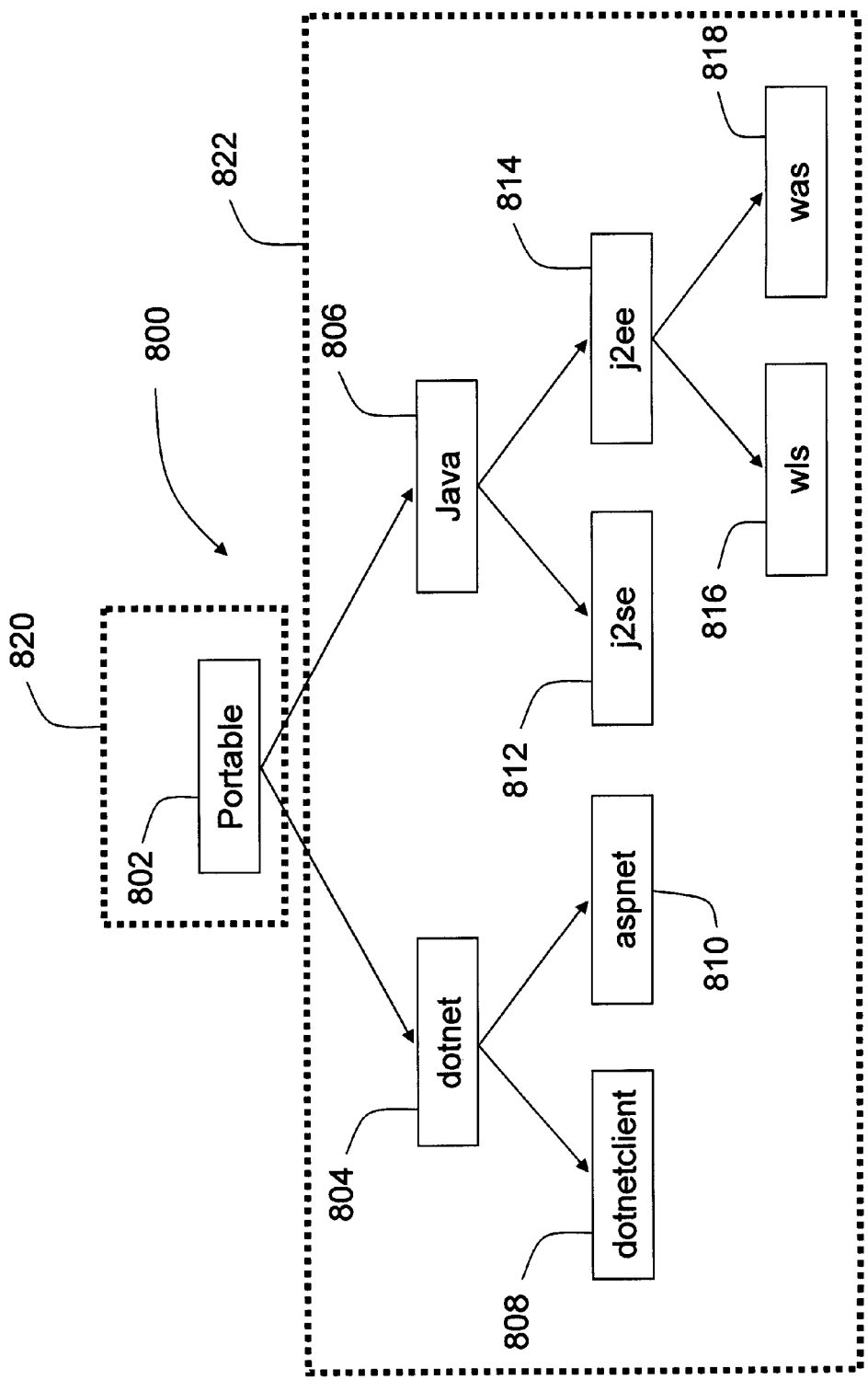
FIG. 8 illustrates a portability tree that can be utilized to classify a set of code as portable and another set of code as non-portable.

FIG. 8 illustrates a portability tree 800 that can be utilized to classify a set of code as portable and another set of code as non-portable. The portability tree 800, as seen in FIG. 8, depicts an example of a plurality of platforms and the relative level of portability for each of those platforms. A portable region 820 of the portability tree 800 indicates code that can run on a portable platform, thereby being platform independent. Further, a non-portable region 822 of the portability tree 800 indicates code that needs to run on a non-portable platform, thereby being capable of being compiled with code from the portable library 652. The leaflets of the portability tree 800 are placeholders for code in actual platforms where as any of the nodes above the leaflets are placeholders for code in virtual platforms. Through a downward propagation of the portability tree 800, the virtual platforms map to leaflets that hold code for actual platforms.

The root of the portability tree 800 is the most portable virtual platform where as the leaflets are the most specific and non-portable. For instance, if the code included in the enterprise module A 351 is written according to a portable node 802, the code can be utilized on any of the intended actual platforms for which the leaflets store code. At the next level of the portability tree 800, the code in the enterprise module A 351 is written in code for either the .Net 804 node or the Java 806 node. If the code is written for the .Net 804 node, then the code may not be compatible with the Java node 806, and vice versa. At the next level of the portability tree 800, the code in the enterprise module A 351 is written for the dotnet client node 808, the aspnet node 810, the j2se node 812, or the j2ee node 814. Code written in the dotnet client node 808 or the aspnet node 810 is compatible with the .Net node 804. Further, code written in the j2se node 812 or j2ee node 814 is compatible with Java 806. At the next level of the portability tree 800, the code in the enterprise module A 351 is written for the wls node 816 or the was node 818. Further, code written for the wls node 816 or the was node 818 is compatible with j2ee node 814. One of ordinary skill in the art will be familiar with these different platforms. Accordingly, the portability tree 800 can be utilized to classify the different pieces of code in the enterprise module A 351.

For instance, after performing a portability tree 800 analysis on the code of the enterprise module A 351, it may be determined that the enterprise module A 351 has a library and/or executable with code written and/or generated at the portable node 802, code written and/or generated for .Net 804, and code written and/or generated for the was node 818. With respect to the code for the portable node 802, the enterprise module A 351 can run this code on any platform. During a build, code can be generated for each of the platforms in the leaflet nodes. Accordingly, a downward propagation can be performed to build code for each of the platforms at a lower level. A downward propagation is intended to mean a traverse down to the leaflets of a position in the portability tree 800.

With respect to the code for .Net node 804, the enterprise module A 351 can run this code on any .Net platform. Further, a downward propagation can be utilized to generate code on any of the platforms that are leaflets from the .Net node 804, e.g., the dotnet client node 808 and the aspnet node 810. However, this code cannot be run on any of the leaflet nodes of the Java node 806, e.g., the j2se node 812 or the j2ee node 814, or any of the leaflets from the j2ee node 814, e.g., the wls node 816 or the was node 818. The code at the leaflet nodes needs to be compiled with the intersection library 650 and the portable library 652 to ensure that the platform specific routines needed by the platform dependent code is available.

Figure 9:
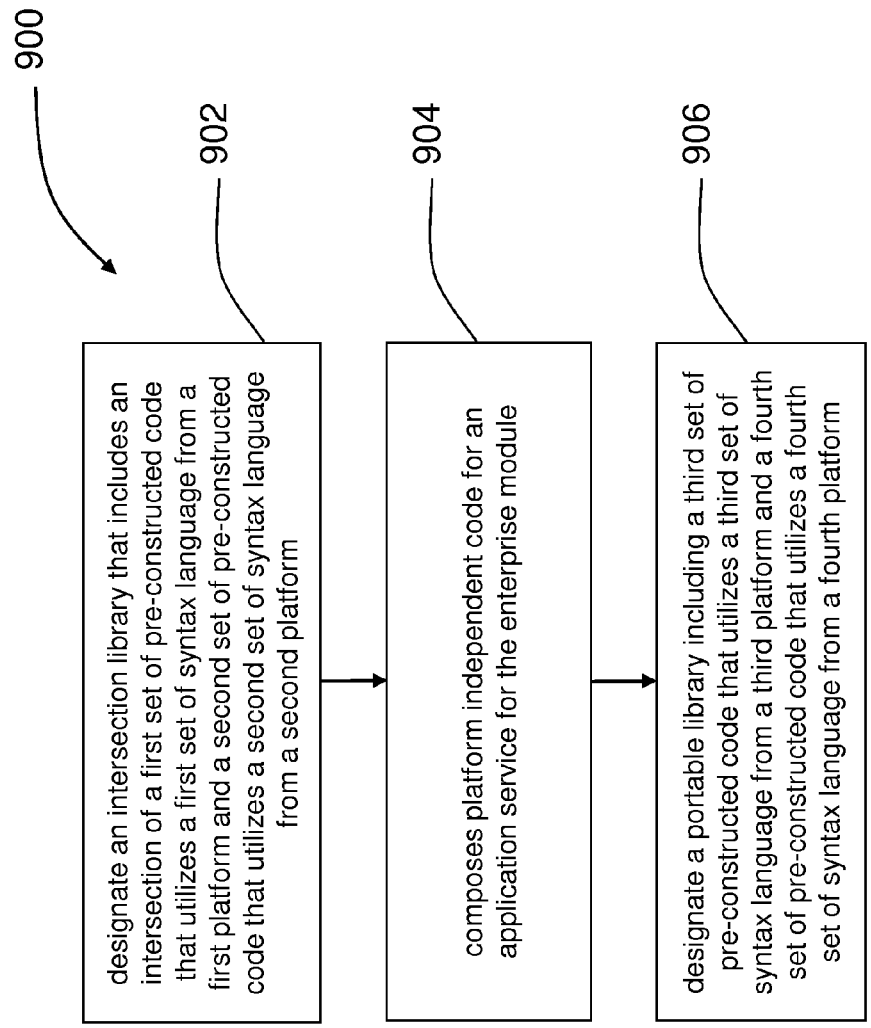
FIG. 9 illustrates a process that can be utilized for creating a plurality of libraries that can be utilized by the enterprise module A.

FIG. 9 illustrates a process 900 that can be utilized for designating a plurality of libraries that can be utilized by the enterprise module A 351. At a process block 902, the process 900 designates an intersection library that includes an intersection of a first set of pre-constructed code that utilizes a first set of syntax language from a first platform and a second set of pre-constructed code that utilizes a second set of syntax language from a second platform. Further, at a process block 904, the process 900 composes platform independent code for an application service for the enterprise module. The platform independent code is compiled and linked with the intersection library. In addition, at a process block 906, the process 900 designates a portable library that includes a third set of pre-constructed code that utilizes a third set of syntax language from a third platform and a fourth set of pre-constructed code that utilizes a fourth set of syntax language from a fourth platform. The third set of pre-constructed code and the fourth set of pre-constructed code composed in order to accomplish the same task, the portable library being compiled with platform dependent code for a core service for the enterprise module.

Figure 10:
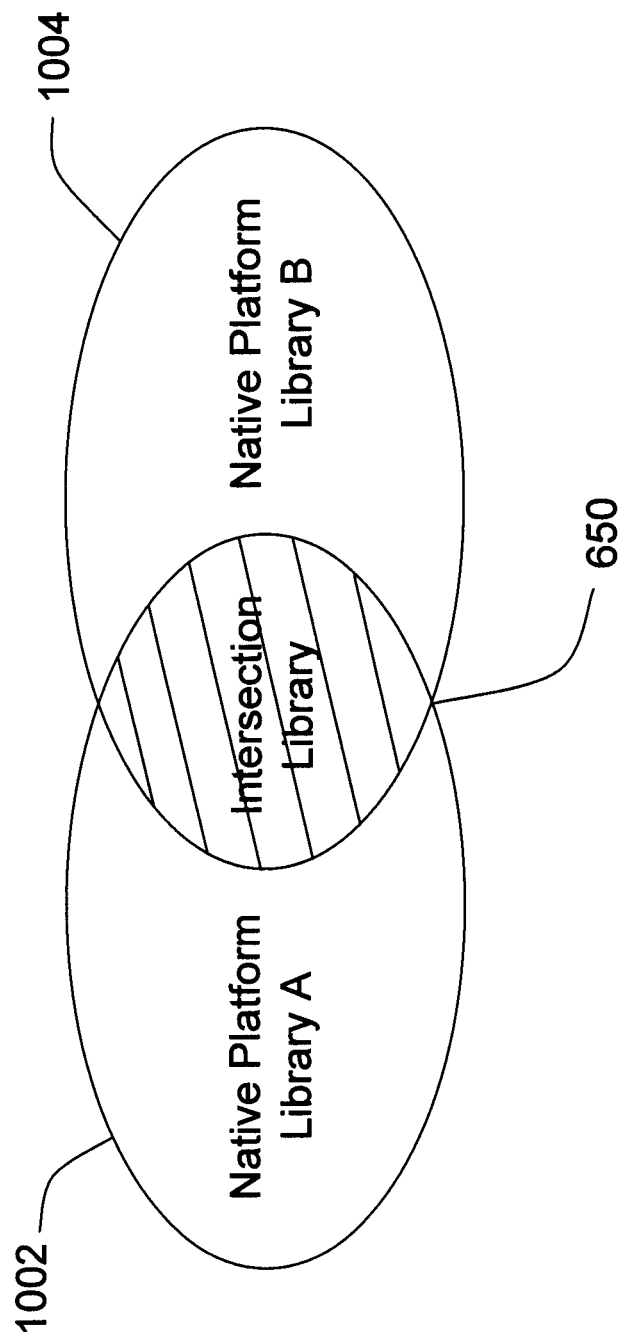
FIG. 10 illustrates the intersection library.

FIG. 10 illustrates the intersection library 650. Native platform library A 1002 has a first set of pre-constructed code that is included within the bounded area of platform independent library A 1002. Further, native platform library B 1004 has a second set of pre-constructed code that is included within the bounded area of platform independent library B 1004. The intersection library 650 includes the intersection of function signatures, e.g., method names and arguments, from the native platform library A 1002 and the native platform library B 1004.

Figure 11:
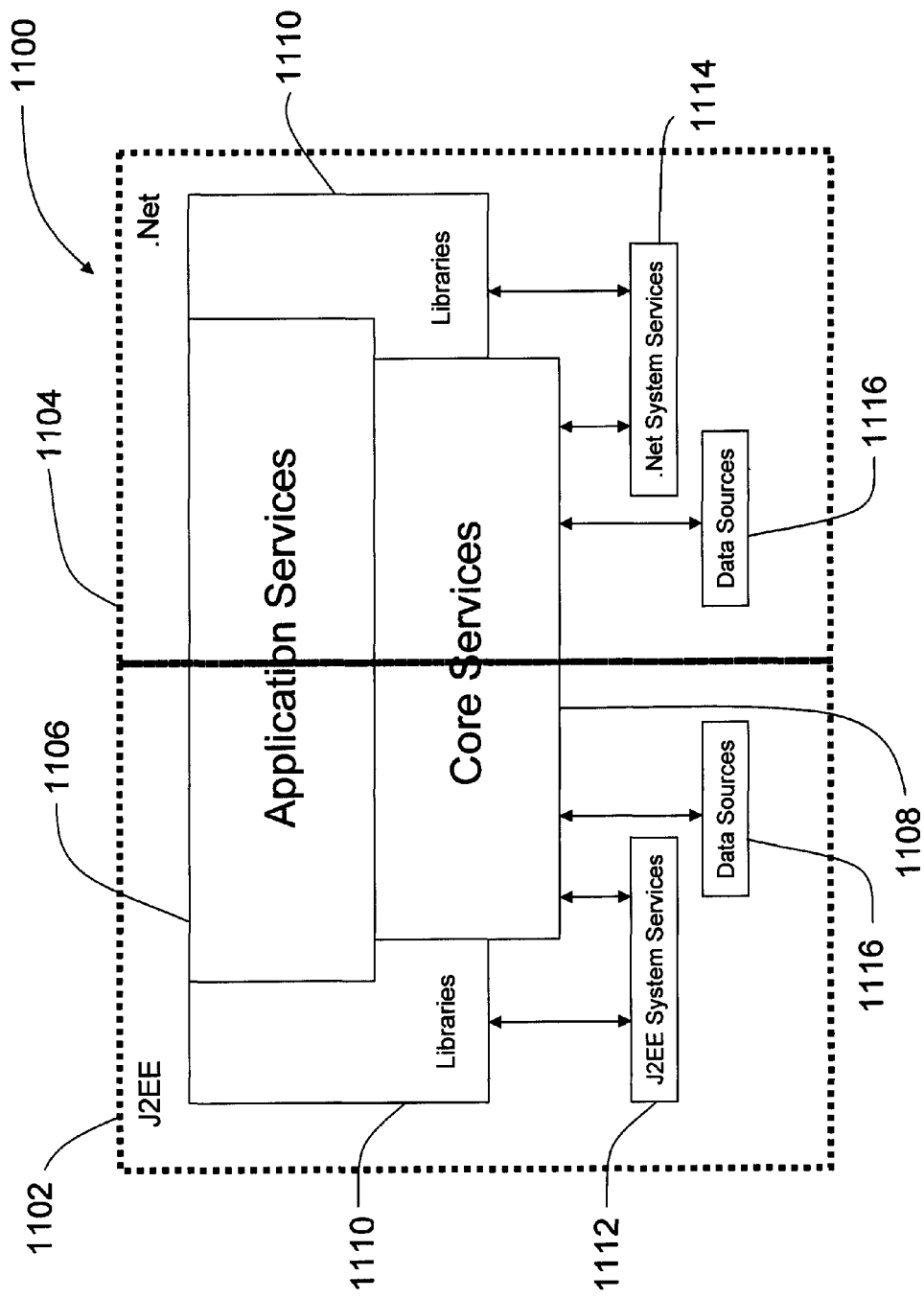
FIG. 11 illustrates an example of a configuration in which services can be divided into those that utilize platform independent code and those that use platform dependent code.

FIG. 11 illustrates an example of a configuration 1100 in which services can be divided into those that utilize platform independent code and those that use platform dependent code. For instance, code can be written and/or generated so that the code can run on either a J2EE platform 1102 or a .Net platform 1104. The code provides application services 1106 and core services 1108. The application services 1106 include the application logic for the enterprise module. Further, the core services 1108 include code for the infrastructure for the enterprise module. Examples of core services 1108 are Generic Data Services, Bus Comp Services, and Data Access Services. In one embodiment, the applications services 1106 are written and/or generated according to the subset of platform independent computer languages while the core services 1108 are written and/or generated according to platform dependent computer languages. Further, the libraries 1110 include the intersection library 650 and the portable library 652 so that the pre-constructed code is available for both the J2EE platform 1102 and the .Net platform 1104. For instance, the intersection library 650 can provide pre-constructed code for both the J2EE platform 1102 and the .Net platform 1104 because the intersection library 650 includes pre-constructed code that is part of a subset of code that can run on the J2EE platform 1102 and code that can run on the .Net platform 1104. In addition, the portable library 652 can provide pre-constructed code for both the J2EE platform 1102 and the .Net platform 1104 because the portable library 652 includes pre-constructed code that is platform specific for the J2EE platform 1102 and pre-constructed code that is platform specific for the .Net platform 1104. In other words, the intersection library 650 includes pre-constructed code to perform a task where as the portable library 652 includes multiple pieces of codes to accommodate different platforms, such as the J2EE platform 1102 and the .Net platform 1104. As a result, the enterprise module can be run on any of the intended platforms.

In addition, a set of data sources 1116 can be provided to the core services 1108. The same data sources can be provided to either the J2EE platform 1102 or the .Net platform 1104. However, specific system services are provided to each of the platforms. For instance, J2EE system services 1112 are provided to the core services 1108 and the libraries 1110. In one embodiment, the J2EE system services 1112 are provided to the portable library 652. Further, .Net system services 1114 are provided to the core services 1108 and the libraries 1110. In one embodiment, the .Net system services 1114 are provided to the portable library 652.

In another embodiment, the application services 1106 are not entirely platform independent. For instance, most of the application services 1106 may have code which is written and/or generated according to the syntax language for the subset of the code that can be run on the J2EE platform 1102 or the .Net platform 1104 while some of the application services 1106 may have multiple pieces of platform specific code for a particular service. One piece of code can be written and/or generated for the J2EE platform 1102 while another piece of code for the same particular service can be written and/or generated for the .Net platform 1104.

In yet another embodiment, most of the core services 1108 may have code which is written and/or generated according to the platform specific syntax language for the code that can be run on the J2EE platform 1102 or the platform specific language for the code that can be run on the .Net platform 1104 while some of the core services 1108 may be written and/or generated according to the syntax language for the subset of the code that can be run on the J2EE platform 1102 or the .Net platform 1104.

In another embodiment, a service invocation layer may exist between the layer for the application services 1106 and the core services 1108. The service invocation layer may have code which is written and/or generated according to the syntax language for the subset of the code that can be run on the J2EE platform 1102 or the .Net platform 1104. In addition, the service invocation layer may also have code which is written and/or generated according to the platform specific syntax language that can be run on the J2EE platform 1102 or code which is written and/or generated according to the platform specific syntax language that can be run on the .Net platform 1104.

Accordingly, the application services 1106 can run on both J2EE and .Net. The interfaces for these application services can be modeled as Web Services using WSDL and XML Schema. For instance, the interfaces can be prepared in WSDL and XML Schema, and can then be provided to the component transmogrifier 630, as seen in FIG. 6, to output platform dependent source code 634. The libraries 1110 can then be utilized to access the J2EE system services 1112 and the .Net system services 1114. For example, the J2EE system services 1112 and the .Net system services 1114 can include error handling, localizable strings, configuration, caching, state values and statistics, diagnostics and tracing, request context, service invocation, and XML and Web Services. A portion of the libraries 1110 may be exposed to Java classes while another portion of the libraries 1110 may be exposed to Web Services.

Some of the different system services that can be utilized for the J2EE system services 1112 and the .Net system services 1114 shall now be described. With respect to error handling, the error framework can be based on exceptions prepared in C# and Java. Exceptions are utilized to signal abnormal behavior and are not utilized to handle conditions expected as part of the normal flow.

In addition, with respect to diagnostics, a unified mechanism to monitoring the health of the system is a requirement not only for application developers, but for core developers as well. A reach functional API is provided that interfaces seamlessly with the native platform's facilities and that will not incur on any significant overhead. The reach functional API will consist of a series of APIs to log messages (including error logging), and a mechanism to profile request processing. These facilities integrate with the diagnostic tools native to the platform where the code is executing.

Further, localizable strings can be defined as key value pairs. Strings can be grouped by enterprise module and are identified by the unique key for the string. The unique key can be a symbolic name that includes a component code and a symbolic name. Further, the localizable strings can be defined in XML files. Each enterprise module in a source tree can have a "strings" directory which can contain all the localized string files for the given enterprise module.

In one embodiment, caching functionality is provided on top of the native caching mechanisms. Accordingly, the native caching mechanisms are taken into account when utilizing the interfaces described above.

Figure 12:
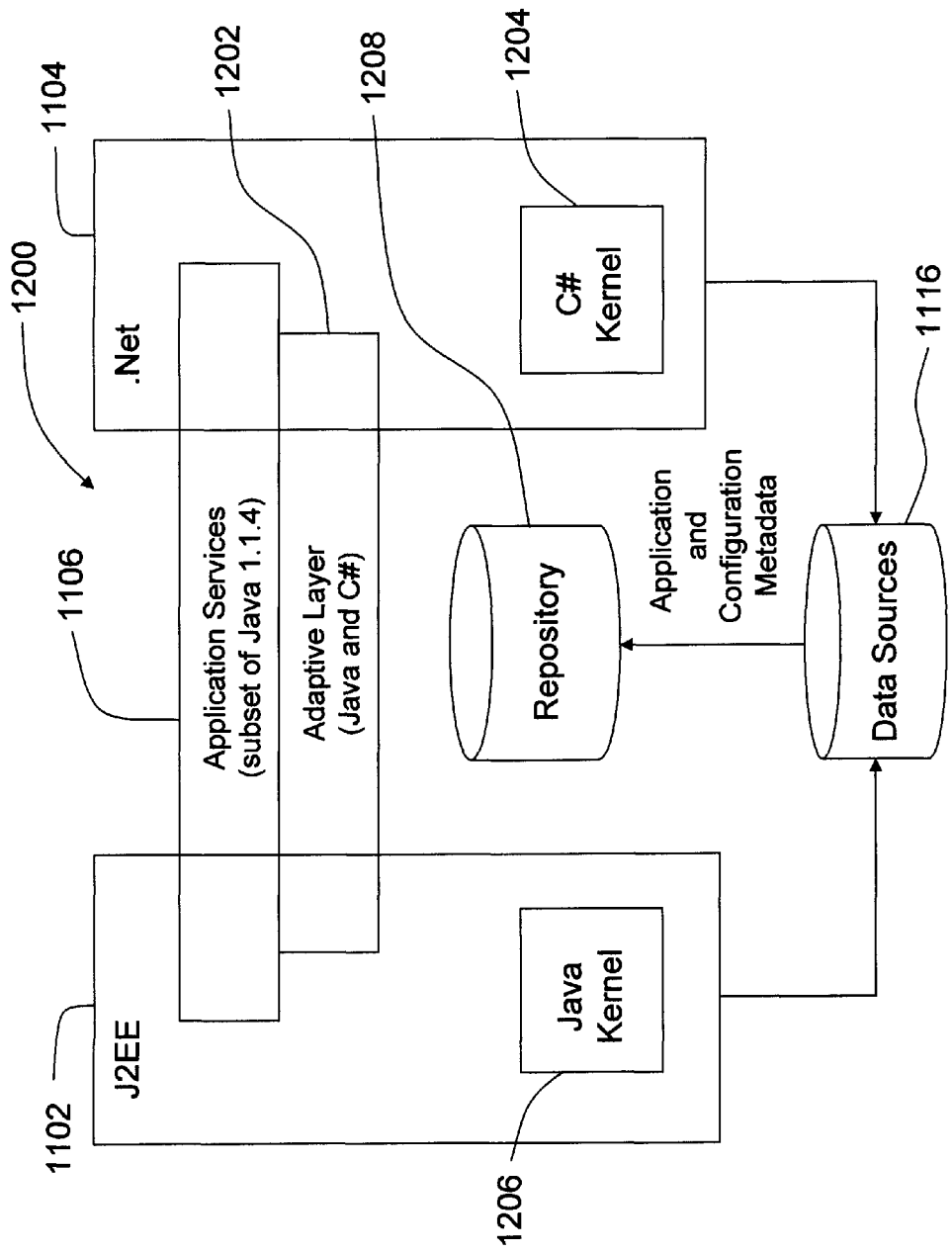
FIG. 12 illustrates a server architecture built utilizing the configuration as seen in FIG. 11.

FIG. 12 illustrates a server architecture 1200 built utilizing the configuration 1100 as seen in FIG. 11. The server architecture 1200 implements the application services 1106, which can be run on both the J2EE platform 1102 and the Java platform 1104 because the applications services 1106 utilize a subset of Java 1.1.4. Further, an adaptive layer 1202 utilizes Java and C#. Accordingly, the adaptive layer 1202 has multiple sets of code to accomplish the same task. Further, a C# kernel 1204 and a Java kernel 1206 are each written and/or generated. The C# kernel 1204 can be utilized with the .Net platform 1104, and the java kernel 1206 can be utilized with the J2EE platform 1102. Data from the J2EE platform 1102 and the .Net platform 1104 can be provided to the data sources 1116. Further, application and configuration metadata are sent from the data sources 1116 to a repository 1208.

Management

The basic motivation for investing in an enterprise management system is to reduce the total cost of ownership ("TCO"). Addressing system-usage optimization and simplifying overall system management consoles can dramatically reduce the cost of ownership. When enterprises would buy a single monolithic system, system management could be confined to a single proprietary console/solution developed by the vendor. However, enterprise systems are becoming far less monolithic and more service oriented, resulting in highly configurable subsystems integrated together with no single management console. As a result, there may be a decreased purchased cost, but there may also be an increase in management costs and higher potentials for inefficient system usage.

Just as the enterprise modules are platform independent and open, the management architecture that is utilized to monitor the performance of the enterprise modules is also platform independent and open. Further, the management architecture is utilized to monitor the health of the enterprise modules and the system that the enterprise modules are run on. In addition, the management architecture also commands and controls operations.

Accordingly, the management architecture can be implemented to run natively on the system utilized at the customer site 310, as seen in FIG. 3. For instance, the management architecture can be utilized irrespective of whether the customer utilizes a J2EE or .Net environment. The underlying .NET system management infrastructure is Windows Management Instrumentation ("WMI"). Further, the management infrastructure for J2EE is Java Management Extensions ("JMX"). The management architecture can provide a set of console functions that can be utilized in an environment such as WMI or JMX and can be integrated seamlessly with the console functions at the customer site 310, as seen in FIG. 3. A console function is utilized through a graphical user interface ("GUI"). In addition, the management infrastructure can provide for a programmatic interface that allows other applications to monitor and manage the system. The programmatic interface may not have a GUI. Further, the programmatic interface may conduct the monitoring automatically without any user input based on a set of conditions.

Figure 13:
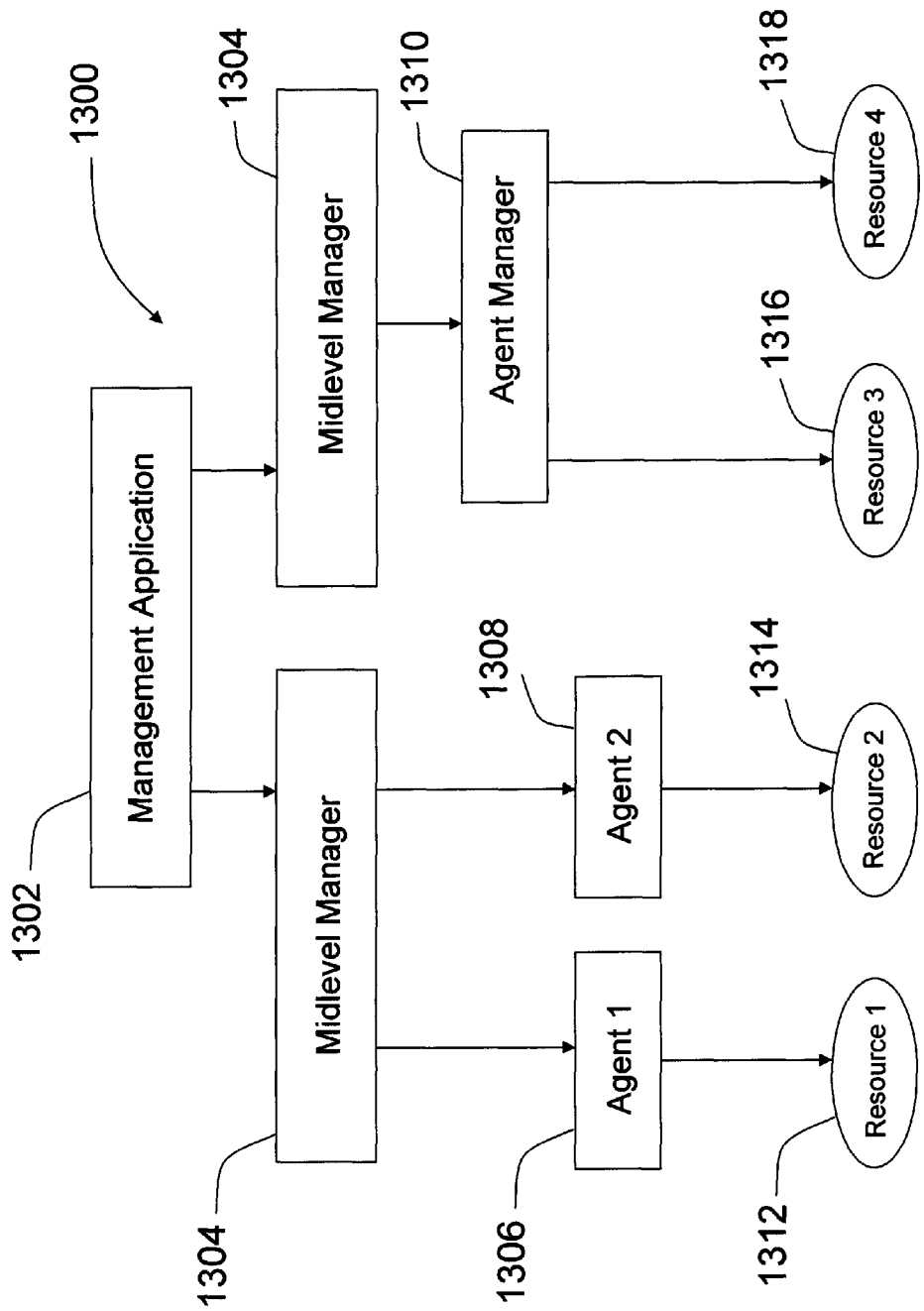
FIG. 13 illustrates a manager-agent architecture that can be utilized to manage resources in an enterprise system.

FIG. 13 illustrates a manager-agent architecture 1300 that can be utilized to manage resources in an enterprise system. In addition, a plurality of models are utilized to facilitate the manager-agent architecture 1300. For instance, an organizational model can define the entities and the role of each of the entities. Further, an information model can define the structure of the management information. In addition, a communication model can define the operations and protocol for accessing the information model. Finally, a functional model can define generic management services that can be utilized to manage any resource.

A managed resource is a computer system, computer network, computer application component, or enterprise module that needs to be managed. A management application 1302 manages the managed resources. The management application 1302 is the software component that utilizes the information model and communication model to gain access to managed resources data and operations. Management applications have a large range in the functions they provide. The management application 1302 is responsible for providing a user interface to manage the resources. The management application 1302 can register for event notifications (from agents) for both operator's views and catalysis for predefined automated actions. In addition, the management application 1302 is responsible for obtaining (or polling) managed resources for attribute values and invoking operations on the managed resource. Further, an advanced management applications, such as an SNMP agent, can also automatically discover resources and operations, thereby reducing the responsibility of the management application 1302. Irrespective of the sophistication of the management application 1302, a level of customization can be provided to allow business rules to be configured.

A first management agent 1306 provides the infrastructure for the communication model and informational model by providing an adapter for a first managed resource 1312 and the management application 1302 to integrate. This integration consists of sending data and events from the first managed resource 1312 to the management application 1302 and requesting data and commands from the management application 1302 to the managed resource 1312. This communication is conducted with management application specific API and via predetermined network protocols. A second management agent 1308 can interact with a second managed resource 1314 in a similar manner. In addition, an agent manager 1310 can interact with multiple managed resources, such as a third managed resource 1316 and a fourth managed resource 1318, as opposed to a single managed resource in a similar manner.

A midlevel manager 1304 aggregates and filters the information from the managed resources. The midlevel manager 1304 then forwards the information to the management application 1302 through an agent or agent manager. Further, the midlevel manager 1304 also polls the managed resources in the midlevel manager's domain for availability and forwards exceptions to the management application 1302. The midlevel manager's domain dictates a logical grouping of managed resources. The grouping can be determined by physical characteristics such as location or type. Further, the grouping can also be determined by business characteristics, such as application or department. Accordingly, the midlevel manager increases the quality of information while reducing the rate and quantity of incoming messages that are handled by the management application 1302.

Not all resources in a distributed application need to be managed. Further, some groups of resources are managed as a functional unit rather than as an individual unit. This functional unit may span horizontally, vertically, or both.

Managed resources span horizontally when the resources are managed in a layered approach. For example, logging, authentication, authorization, auditing, and request tracking span horizontally. A group of horizontally managed resources have context across a plurality of applications and can be managed by an individual component.

Further, managed resources span vertically when the resources are managed based on the particular application or module for which the resource is being utilized. For instance, vertically managed resources include web services, performance counters, and component version.

Some managed resources may span both horizontally and vertically. An example of such a managed resource is logging.

In one embodiment, the managed resources are responsible for exposing their managed data and operations to the management application 1302 by mapping into the information model. The managed resource can provide a description of itself, configuration data, and a performance metric indicating status. Further, the managed resource can be responsible for interacting with the management application 1302 via the agent communication model, operations, and protocol that the management architecture utilizes.

Management data can be classified as identification data, configuration data, statistical data, and status data. Further, management operations can be classified as lifecycle control (start, stop, restart, refresh, etc.), query, configure, and custom. With respect to lifecycle control, each resource has a lifecycle. The lifecycle includes deployment, installation, start, execution, stop, maintain, and uninstallation. Deployment is the movement of resource files to a target system. Further, installation involves installing resources in a target system. In addition, start includes initializing a resource that the resource executes. Execution involves actively performing functions such as monitoring to periodically check a resource attribute, operating to invoke operations, and configuring to permanently change configuration data. Stop includes terminating a resource so that the resource is no longer executing. Further maintain includes applying code and configuration changes. Finally, uninstall includes removing a resource from the target system. The management operations are utilized to control, locally and/or remotely, all components of a managed resource.

Figure 14:
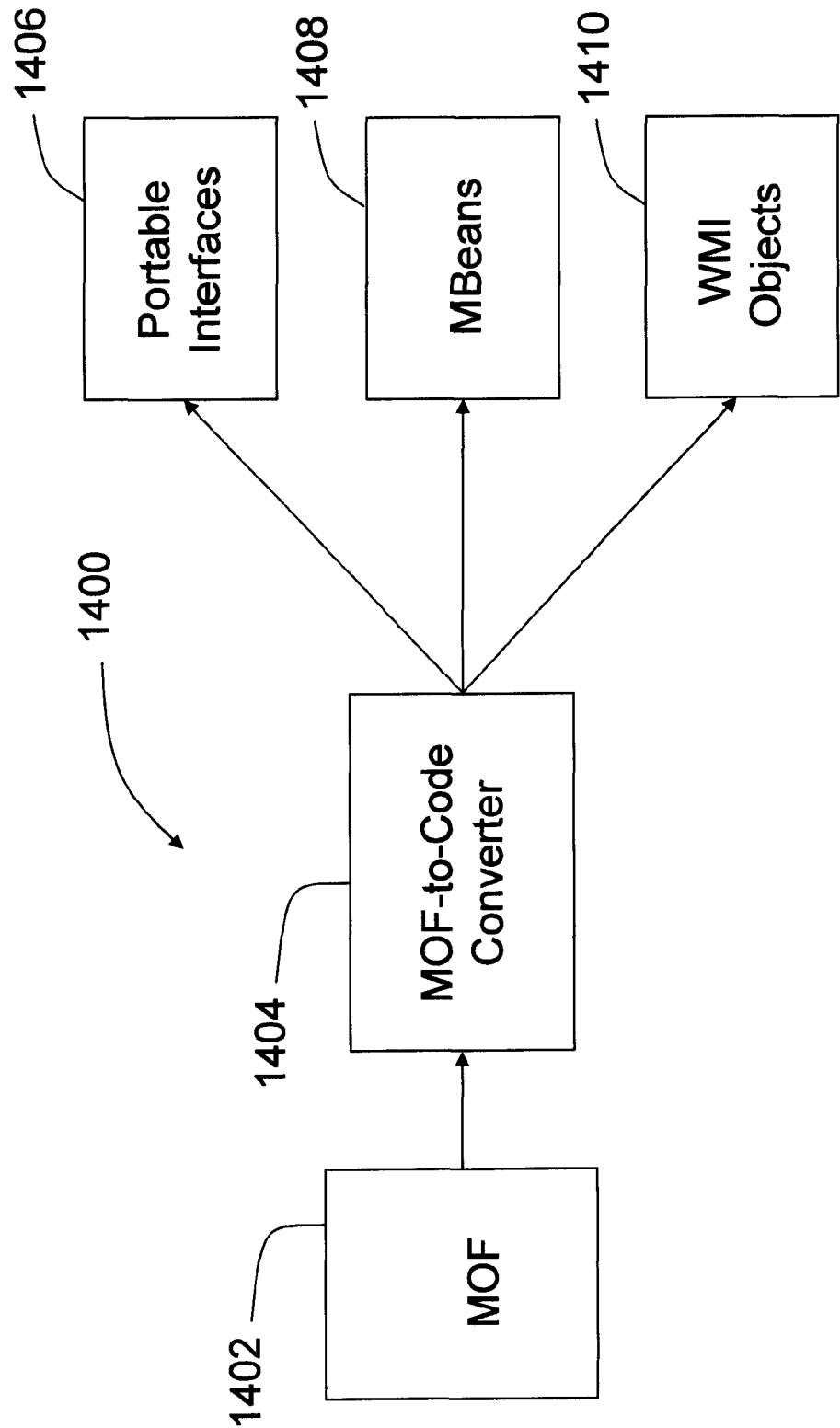
FIG. 14 illustrates a block diagram for a management code development system.

FIG. 14 illustrates a block diagram 1400 for a management code development system. The management code development system can provide a platform independent mechanism for application developers to manage objects. Accordingly, developers can define their managed objects in a platform independent Managed Object Format ("MOF") 1402. An example of an MOF is XML. Further, an MOF-to-Code converter 1404 can be used to transform the independent definition into a series of portable and native management objects. In one embodiment, the MOF-to-Code converter 1404 converts the MOF 1402 file into portable interfaces 1406, MBeans 1408, or WMI Objects 1410.

The portable interfaces 1406 include a proxy and a stub file that allow a resource, e.g., the first resource 1312 as seen in FIG. 13, to be platform independent. As an example, if there is a managed object named Example defined in the ExampleMof.xml file, issuing the command mof2code ExampleMof.xml yields two additional class definitions: ExampleStub and ExampleProxy. ExampleStub is used as the Example provider base class for defining a provider for the Example managed object. ExampleProxy is the class that application developers use to access the Example managed object. The generated ExampleStub class acts as the provider base class from which managed object providers are derived from for implementing the Example managed object provider. ExampleStub is a thin adapter designed to interact with the underlying native management infrastructure to provide and revoke operations and managed objects. Further, the ExampleProxy class is used by the application developer to transparently interact with the Example managed object. ExampleProxy is also a thin adapter designed to interact with the underlying native management infrastructure on behalf of the client.

In addition to the portable interfaces 1406, the MOF-to-Code converter 1404 generates platform dependent code for a plurality of different environments so that the actual environment that the customer utilizes is irrelevant as long as the environment is in the plurality. For example, the MOF-to- Code converter 1404 produces MBeans 1408 in case the customer has a J2EE JMX management environment or WMI Objects 1410 in case the customer has a .Net management environment.

Figure 15:
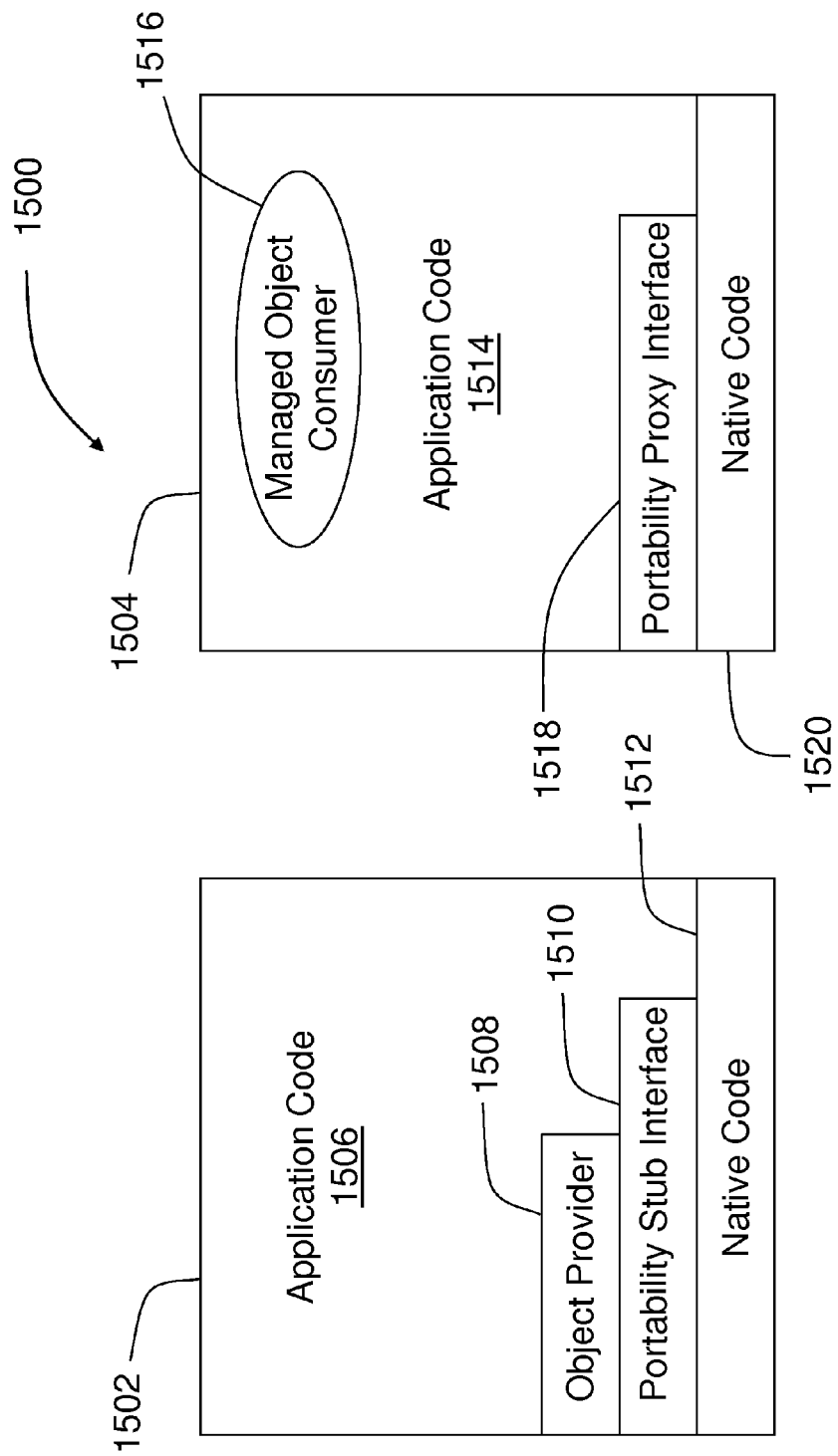
FIG. 15 illustrates a system management infrastructure.

FIG. 15 illustrates a system management infrastructure 1500. Accordingly, the system management infrastructure 1500 provides a set of portability stub code 1502 and a set of portability proxy code 1504. The set of portability stub code 1502 includes application code 1506, object provider code 1508, portability stub interface code 1510, and native code 1512. The generated stub is implemented in the platform independent layer as the portability stub interface 1510 and provides a base mechanism for the object provider to build on top of. The generated base class hides the underlying system management details, thereby allowing the object provider to only be concerned with the managed object functionality. Further, the native code 1512 is platform dependent and provides an adapter from the platform independent layer and the underlying system management infrastructure. Accordingly, depending on the platform, either .NET WMI objects or J2EE JMX MBeans will be generated. In addition, the object provider code 1508 is a user-implemented class that is derived from the generated platform stub class and is responsible for implementing all the resource management. Further, the object provider code is responsible for implementing the managed resource data and operational aspects. In one embodiment, the portability stub interface code 1510 and the native code 1512 are generated stub code where as the application code 1506 and the object provider code 1508 are hand written code.

The set of portability proxy code 1504 includes application code 1514, managed object consumer code 1516, portability proxy interface 1518, and native code 1520. The generated proxy for the portability proxy interface 1518 is a strongly-typed object that allows client code to treat the managed code as if they are in the current address/object space. Since the generated proxy will be implemented in the platform native language, clients are hidden from the actual underlying implementation details and provide an object interface for managed objects. The native code 1520 is similar to the native code 1512. Further, the managed object consumer code 1516 is code that makes use of the managed object's proxy code. In one embodiment, the portability proxy interface code 1518 and the native code 1520 are generated proxy code where as the application code 1514 and the managed object consumer code 1516 are hand written code.

Figure 16:
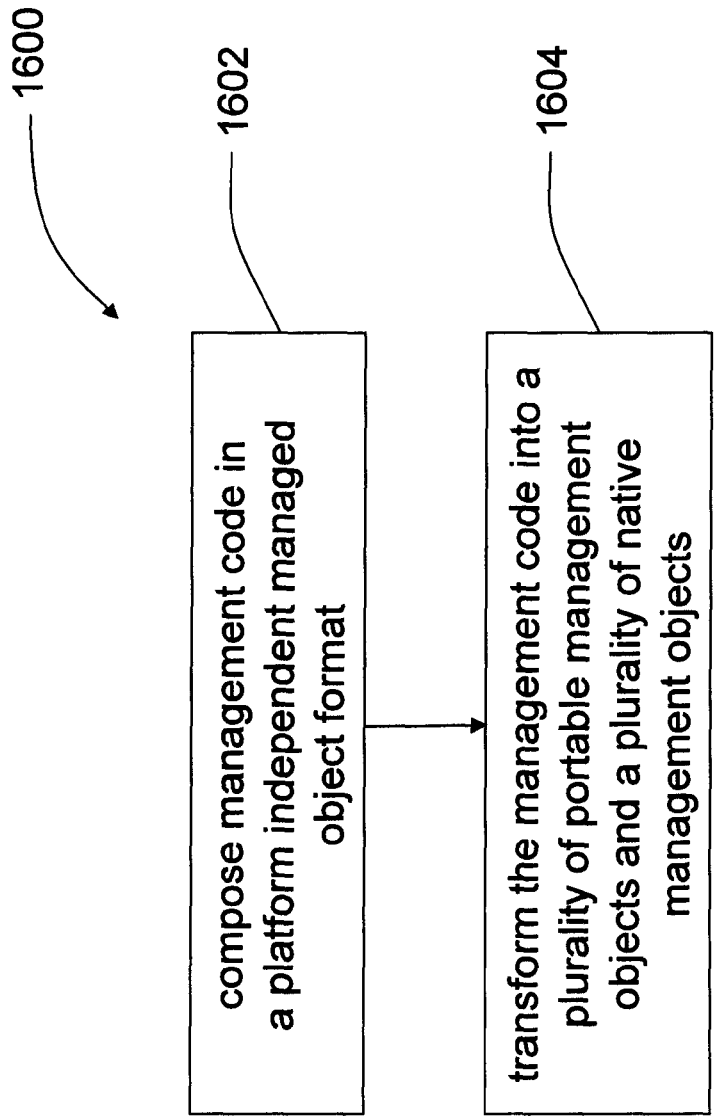
FIG. 16 illustrates a process of providing a management architecture.

FIG. 16 illustrates a process 1600 of providing a management architecture. At a process block 1602, the process 1600 composes management code in a platform independent managed object format. The management code is utilized to manage at least one object. Further, at a process block 1604, the process 1600 transforms the management code into a plurality of portable management objects and a plurality of native management objects. Alternatively, the process 1600 can assign at least one console function to each of the portable management objects and native management objects. Further, the process 1600 does not have to produce both a plurality of portable management objects and a plurality of native management objects. In other words, the process 1600 can produce either a plurality of portable management objects or a plurality of native management objects. The process 1600 can also produce one portable management or one native management object as opposed to a plurality.

Figure 17:
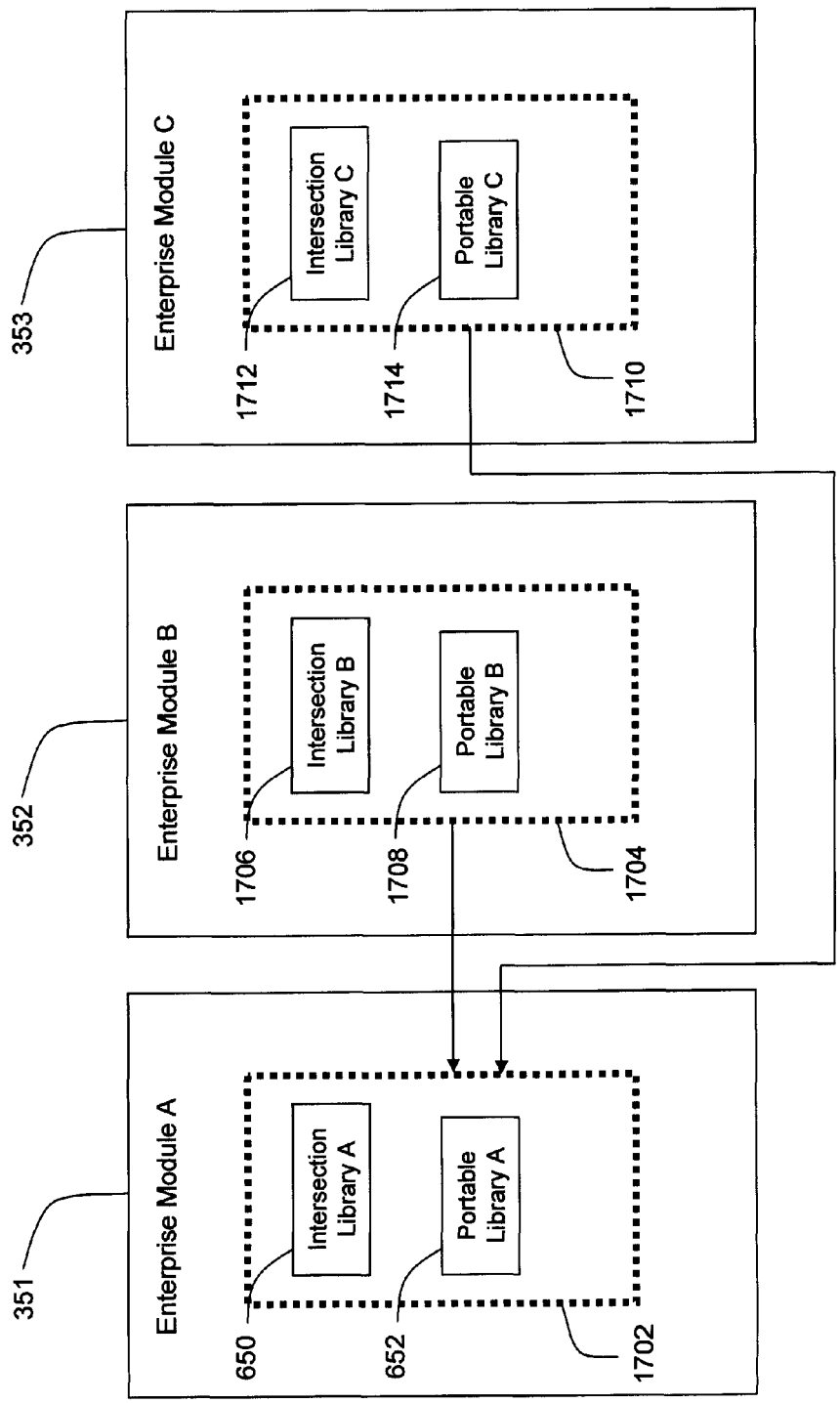
FIG. 17 illustrates enterprise module dependencies.

FIG. 17 illustrates enterprise module dependencies. A library collection 1702 from the enterprise module A 351 depends on code form a library collection 1704 from the enterprise module B 352 and a library collection 1710 from the enterprise module C 353. The library collection 1702 includes the intersection library A 650 and the portable library A 652. Further, the library collection 1704 includes an intersection library B 1706 and a portable library B 1708. In addition, the library collection 1710 includes an intersection library C 1712 and a portable library C 1714.

In the example of the pre-constructed function "reorient" discussed above, the enterprise module A 351 may wish to utilize the function "reorient," but may not actually have the code stored in the library collection 1702. Further, in order for the enterprise module A 351 to be portable, the code it utilizes has to be able to be run on multiple platforms. For instance, the code that supports "reorient" in the .Net platform may be found in the library collection 1704 of the enterprise module B 352 while the code that supports "reorient" in the J2EE platform may be found in the library collection 1710 of the enterprise module C 353.

As will be discussed further, the code in the enterprise module A 351 may include libraries and/or executables. In one embodiment, a dependency declaration is provided at the level of the library or executable. Tags can be used to indicate the dependencies. For instance, a "<platformDepend>" tag can be utilized to indicate a dependency relationship. In the context of FIG. 17, the following code is provided as an example to illustrate the dependency of the portable library A 652 of the enterprise module A 351 to the portable library 1708 of the enterprise module B 352 and the portable library 814 of the enterprise module C 353.

```
<libraries>
    <library name="portablelibraryA">
        <platform name="java" >
            <platformDepend module="B" component="library"
            name="portablelibraryB" />
            <code language="java" includes="**/*.java" />
        </platform>
        <platform name="dotnet">
            <platformDepend module="C" component="library"
            name="portablelibraryC" />
            <code language="java" includes="**/*.java" />
        </platform>
    </library>
```

When the portable library A 652 of the enterprise module A 351 is compiled on a Java platform, the portable library A 652 will have a dependency to the portable library B 1704 of the enterprise module B 352. On the other hand, when the portable library A 652 of the enterprise module A 351 is compiled on a .Net platform, the portable library A 652 will have a dependency to the portable library C 1714 of the enterprise module C 353.

In another embodiment, the portable library A 652 of the enterprise module A 351 may be able to rely on at least a portion of its own code, thereby allowing the portable library A 652 to rely less, or possibly not at all, on the portable library B 1708 of the enterprise module B 352 and the portable library C 1714 of the enterprise module C 353. Accordingly, an analysis is performed to determine what dependencies are needed or whether any dependencies are needed at all.

Figure 18:
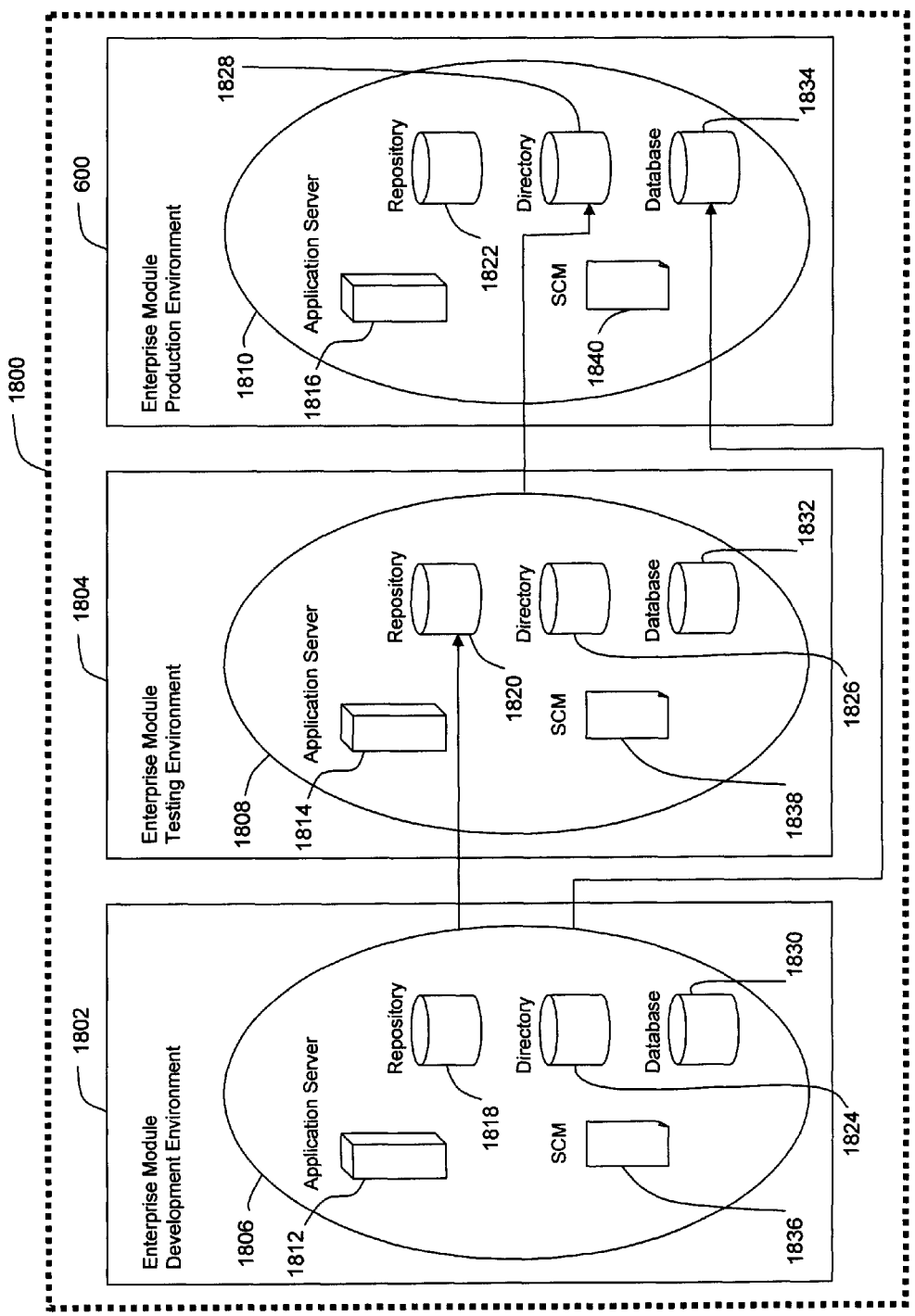
FIG. 18 illustrates a system that can be utilized to construct the plurality of enterprise modules.

FIG. 18 illustrates a system 1800 that can be utilized to construct the plurality of enterprise modules. The system 1800 includes a plurality of environments. The code for the enterprise modules can be developed through an enterprise module development environment 1802 and tested through an enterprise module testing environment 1804 prior to final production in the enterprise module production environment 600.

The enterprise module development environment 1802 includes resources 1806. Further, the resources 1806 include an application server 1812, a repository 1818, a directory 1824, and a database 1830. In one embodiment, a Software Configuration Management ("SCM") system 1836 can also be provided. The application server 1812 hosts the code that is being developed for the enterprise module. Further, the repository 1818 includes a metadata representation of the user interface, business logic, services, functionality and behavior of one or more enterprise applications. In addition, the directory 1824 can hold files for the code. Further, the database 1830 can hold additional data. A developer can utilize the enterprise module development environment 1802 to develop code. Further, the enterprise module development environment 1802 can share the resources 1806 with the enterprise module testing environment 1804 and the enterprise module production environment 600. For instance, as illustrated in FIG. 18, the enterprise module development environment 1802 shares the resources 1806 with the repository 1820 in the enterprise module testing environment 1204. Further, as illustrated in FIG. 18, the enterprise module development environment 1802 shares the resources 1806 with the database 1834 in the enterprise module production environment in the enterprise module production environment 600.

The enterprise module testing environment 1804 includes resources 1808. Further, the resources 1808 include an application server 1814, a repository 1820, a directory 1826, and a database 1832. In one embodiment, an SCM system 1838 can also be provided. The application server 1814 hosts the code that is being developed for the enterprise module. Further, the repository 1820 includes a metadata representation of the user interface, business logic, services, functionality and behavior of one or more enterprise applications. In addition, the directory 1826 can hold files for the code. Further, the database 1832 can hold additional data. A developer can utilize the enterprise module testing environment 1804 to test the code that was developed in the enterprise module development environment. Further, the enterprise module testing environment 1804 can share the resources 1808 with the enterprise module development environment 1802 and the enterprise module production environment 600. In addition, the enterprise module testing environment 1804 may utilize resources from another environment. For instance, as illustrated in FIG. 18, the enterprise module testing environment shares the resources 1808 with the directory 1828 in the enterprise module production environment 600.

The enterprise module production environment 600 includes resources 1810. Further, the resources 1810 include an application server 1816, a repository 1822, a directory 1828, and a database 1834. In one embodiment, an SCM system 1840 can also be provided. The application server 1816 hosts the code that is being developed for the enterprise module. Further, the repository 1822 includes a metadata representation of the user interface, business logic, services, functionality and behavior of one or more enterprise applications. In addition, the directory 1828 can hold files for the code. Further, the database 1834 can hold additional data. A developer can utilize the enterprise module production environment 600 to produce the code that was developed in the enterprise module development environment 1802 and tested in the enterprise module testing environment 1804. Further, the enterprise module production environment 600 may utilize resources from another environment.

Accordingly, a system is provided that includes a plurality of environments. A change to one of the environments is migrated to the other environments through an automated deployment process, without user interaction, to reduce the likelihood of creating a problem as a result of the migration. In other words, a modification to a piece of code in one environment may require multiple changes to code in a different environment. For example, a single logical change may encompass changes to the user-interface, compiled code, metadata, database schemas, third party applications, runtime parameters, seed data, operating system settings, application data, user and group definitions in a directory, message queue names, cryptographic key stores, business processes, office documents, image files, etc. The automated deployment process helps ensure that all of the necessary changes are made in the environment to which code is migrated because forgetting a change or making changes in the wrong order can result in a non-functional environment. In another embodiment, the deployment process can be implemented through user interaction without an automated process. In yet another embodiment, the deployment process can be implemented through a combination of an automated process and user interaction.

The automated deployment process can be implemented through an installer, packager, deployer, and artifacts. The installer is an executable responsible for offloading files which make up the enterprise modules and for configuring the packager and deployer applications to the point where the first business application could be deployed to an applications server. Further, the packager is an executable responsible for understanding the configuration of a workspace and creating releases based on that workspace. For example, the packager could be pointed at directories containing repository and code artifacts as input, and generate environment-agnostic packaged applications (releases) ready for the deployer. In other words, the packager can configure code for the different enterprise modules that will be part of a release. For example, in J2EE, "earfiles" would be generated. As a further example, in .NET, "vdirs" would be generated. In addition, the packager can create related non-application server items like database schemas, system parameters, or directory entries for both J2EE and .Net. In addition, the deployer is an executable responsible for customizing, sequencing, and executing the deployment of a release into an environment. The deployer is responsible for creating a working application. Finally, the deployment automated process includes packaging artifacts, which are the output of the packager after the packager has herded all of the raw files and other source data into the correct locations. Once created, the packaging artifacts are modified by the deployer for the target environment and then deployed in the proper sequence.

The packager essentially creates a set of standard configuration information for the release, i.e., for the enterprise modules to be deployed. For instance, the packager can create standardized deployment descriptors for an enterprise module to run on J2EE or web.config and Metabase vdir settings for an enterprise module to run on .Net. However, the packaged will not likely be deployable to a target environment because the package has not been customized for the target environment. For instance, the package lacks needed information such as which database pool to utilize, what URLs the web services should live on, which application server particular deployment descriptors and settings should be applied to, etc. The deployer fills in this information.

Further, the packager can handle more constructs that application packages. For instance, the packaging may consist of metadata needed by a specific deployment function.

In addition, the packager can create a preliminary dependency set which includes dependencies that the repository knows about. The deployer can thereafter generate a final dependency set by merging the packager-generated dependencies with the deployer's knowledge of the target environment. The final dependency set can be utilized to determine the ordering of operations in a deployment script. For instance, a final dependency set may include a Service A depending on a Service B which depends on a Service C. Accordingly, the deployment order may be Service C, Service B, and Service A to ensure that Service C is present for Service B and Service A, and that Service B is present for Service A.

Figure 19:
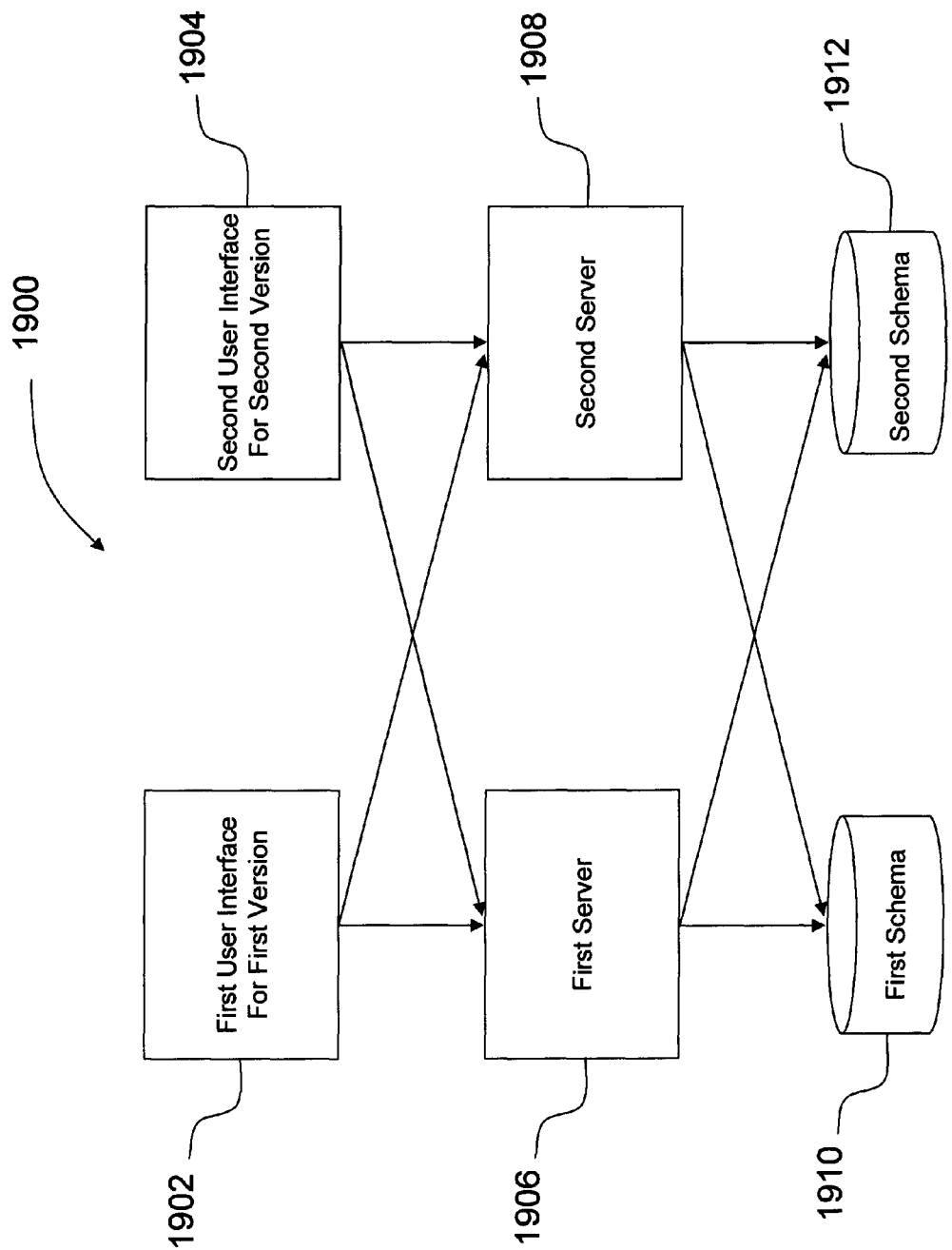
FIG. 19 illustrates a block diagram of a continuous deployment architecture 1900.

FIG. 19 illustrates a block diagram of a continuous deployment architecture 1900. A first user interface 1902 for the first version is utilized for a first user to interact with the first version. The first version can be stored on a first server 1906. In addition, a first schema 1910 for the first version can be stored in the first server 1906. Further, a second user interface 1904 for the second version is utilized for a second user to interact with the second version. The second version can be stored on a second server 1908. In addition, a second schema 1912 for the second version can be stored on the second server 1908. Accordingly, the first version can operate simultaneously with the second version in the same environment because the first version can operate on the first server 1906 and the second version can operate on the second server 1908.

The first user interface 1902 is given access to both the first server 1906 and the second server 1908. In one embodiment, the first version is stored on both the first server 1906 and the second server 1908 so that the first user interface 1902 can access the first version on either server. If the first version is to be replaced by the second version on the first server 1906, the first user can still access the first version on the second server 1908 through the first interface. Accordingly, the first user can access the first version without an interruption in service while there is an update.

Similarly, the second interface 1904 is given access to both the first server 1606 and the second server 1908. In one embodiment, the second version is stored on both the first server 1906 and the second server 1908 so that the second user interface 1902 can access the second version on either server.

The continuous deployment architecture 1900 supports continuous deployment of releases to a target environment by supporting multiple simultaneous versions of each artifact, including business services, business object, business rules, business events, and business process in the same environment. Accordingly, new users can be added without affecting existing users. Further, new applications can be installed without affecting currently running applications. In addition, new versions of an application can be installed without requiring all uses to immediately move to a new version. Further, system administrators are given the opportunity to break up and schedule downtime.

Figure 20:
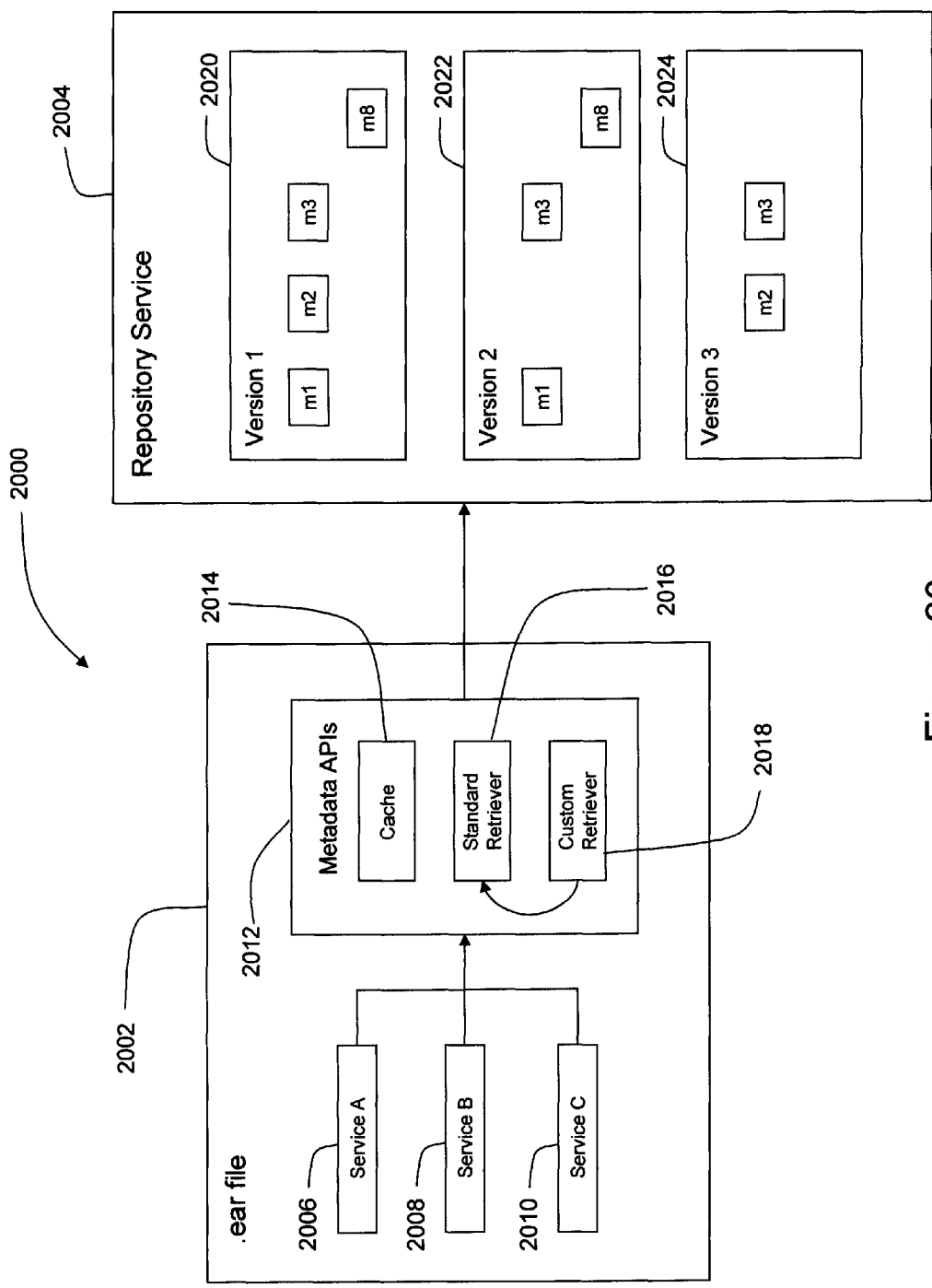
FIG. 20 illustrates a metadata configuration that utilizes metadata for continuous deployment.

FIG. 20 illustrates a metadata configuration 2000 that utilizes metadata for continuous deployment. The metadata can be utilized to determine the version of an artifact. Accordingly, by determining the version of an artifact, a compatible schema can be utilized. Further, the metadata helps identify if older versions are in use so that new versions can eventually replace the old versions. New metadata can be pushed out such that existing clients continue to function against the current versions at the same time that new clients are able to view the newly deployed version.

An Enterprise Archive (".ear") file 2002 contains an application for J2EE. One of ordinary skill in the art will recognize that different environments, e.g., .Net may have a different format than a .ear file, but can nonetheless be utilized. A service A 2006, a service B 2008, and a service C 2010 can be provided. Further, each of these services utilizes the Metadata APIs 2012, which include a cache 2014, a standard retriever 2016, and a custom retriever 2018. In addition, the Metadata APIs 2012 can retrieve metadata from different versions of an artifact, application, etc. from a repository service 2004. The first version 2020 includes various metadata denoted by "m1," "m2," "m3," and "m8." For instance, the metadata can include the version number, component name, field names, constraints, filters, etc. In addition, the second version 2022 includes various metadata denoted by "m1," "m3," and "m8." Accordingly, the second version 2022 shares some similar metadata to the first version 2020. Further, the third version 2024 includes various metadata denoted by "m2" and "m3." The third version 2024 shares some similar metadata with the first version 2020 and the second version 2022. In one embodiment, the metadata contents of each version indicate the version number the artifact, application, etc.

The Metadata APIs 2012 retrieves information, such as the version number, from a Repository Service 2004, which stores data in a repository. For instance, the standard retriever can be utilized to retrieve standard information from the Repository Service 2004. The custom retriever 2018 can indicate customized information that should be retrieved from the Repository Service 2004. The custom retriever 2018 provides a request for the customized information to the standard retriever 2016, which then retrieves standard and/or customized information from the Repository Service 2004.

After retrieving metadata contents from the Repository Service 2004, the Metadata APIs 2012 can store the metadata contents in a cache 2014. The services can then access the metadata contents from the cache 2014 during runtime. In one embodiment, the metadata contents within a version cannot be changed. Accordingly, the metadata contents can stay constant throughout deployment. Further, new metadata contents can be deployed in a new version of an artifact, application, etc. Multiple versions of artifacts, applications, etc. can exist simultaneously in runtime as each version has access to the corresponding metadata contents.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the following claims. The specification and drawings are, accordingly, to be regarded in an illustrative sense rather than a restrictive sense.

The invention claimed is:

1. A method comprising:
composing management code in a platform independent managed object format, wherein
the management code provides a management architecture,
the management architecture is configured to integrate communication between a management application and at least one managed resource in a target environment, and
the management application is configured to manage the at least one managed resource; and
transforming the management code into one or more portable management objects and one or more native management objects,
wherein
the one or more portable management objects comprise
at least one portable interface configured to provide the management application with access to the at least one managed resource,
the one or more native management objects comprise
a first adapter configured to adapt the at least one portable interface to interact with a first native management infrastructure of a first computing platform, and
a second adapter configured to adapt the at least one portable interface to interact with a second native management infrastructure of a second computing platform,
the first computing platform is incompatible with the second computing platform, and
the target environment comprises at least one of the first and second computing platforms.

2. The method of claim 1, further comprising
packaging the one or more portable and native management objects with code for an application service to produce an enterprise module, wherein
the packaging is performed in a build environment,
the enterprise module is configured to provide the application service in the target environment, and
the at least one managed resource comprises the enterprise module.

3. The method of claim 1, wherein
the one or more portable management objects further comprise
a first object derived from a first class configured to access the at least one managed resource, and
a second object derived from a second class configured to implement functionality of the at least one managed resource,
the at least one portable interface comprises a proxy file comprising the first class configured to access the at least one managed resource, and
the at least one portable interface comprises a stub file comprising the second class configured to implement functionality of the at least one managed resource.

4. The method of claim 1, wherein
the one or more portable management objects and one or more native management objects are configured to implement the management architecture in the target environment.

5. The method of claim 2, wherein
the packaging of the enterprise module is configured to customize the code for at least one of the first computing platform and the second computing platform, and
the enterprise module comprises an executable application configured to execute on at least one of the first computing platform and the second computing platform, as a result of the packaging of the enterprise module.

6. The method of claim 4, further comprising
the first native management infrastructure is configured for management data and operations in at least one of a Windows operating system environment and a Java environment.

7. The method of claim 4, wherein
the management application is configured to monitor performance of the at least one managed resource via the management architecture,
the management application is configured to monitor performance of the at least one managed resource via the management architecture, the management architecture comprises a plurality of agents, and each of the plurality of agents is configured to be communicatively coupled to a respective one of the at least one managed resource and to the management application.

8. The method of claim 1, wherein the at least one managed resource further comprises at least one of a native computing platform, computer network, and computer application components.

9. A system comprising:

a processor;

a memory coupled to the processor, said memory storing instructions executable by the processor and executable to compose management code in a platform independent managed object format, wherein the management code provides a management architecture, the management architecture is configured to integrate communication between a management application and at least one managed resource in a target environment, and the management application is configured to manage the at least one managed resource; and transform the management code into one or more portable management objects and one or more native management objects, wherein the one or more portable management objects comprise at least one portable interface configured to provide the management application with access to the at least one managed resource, the one or more native management objects comprise a first adapter configured to adapt the at least one portable interface to interact with a first native management infrastructure of a first computing platform, and a second adapter configured to adapt the at least one portable interface to interact with a second native management infrastructure of a second computing platform, the first computing platform is incompatible with the second computing platform, and the target environment comprises at least one of the first and second computing platforms.

10. The system of claim 9, wherein the one or more portable management objects and one or more native management objects are configured to implement the management architecture in the target environment.

11. The system of claim 10, wherein the management application is configured to monitor performance of the at least one managed resource via the management architecture, the management architecture comprises a plurality of agents, and each of the plurality of agents is configured to be communicatively coupled to a respective one of the at least one managed resource and to the management application.

12. A non-transitory machine readable medium comprising instructions which when executed perform a method comprising:

composing management code in a platform independent managed object format, wherein the management code provides a management architecture, the management architecture is configured to integrate communication between a management application and at least one managed resource in a target environment, and the management application is configured to manage the at least one managed resource; and transforming the management code into one or more portable management objects and one or more native management objects, wherein the one or more portable management objects comprise at least one portable interface configured to provide the management application with access to the at least one managed resource, the one or more native management objects comprise a first adapter configured to adapt the at least one portable interface to interact with a first native management infrastructure of a first computing platform, and a second adapter configured to adapt the at least one portable interface to interact with a second native management infrastructure of a second computing platform, the first computing platform is incompatible with the second computing platform, and the target environment comprises at least one of the first and second computing platforms.

13. The non-transitory machine readable medium of claim 12, wherein the one or more portable management objects and one or more native management objects are configured to implement the management architecture in the target environment.

14. The non-transitory machine readable medium of claim 13, wherein the management application is configured to monitor performance of the at least one managed resource via the management architecture, the management architecture comprises a plurality of agents, and each of the plurality of agents is configured to be communicatively coupled to a respective one of the at least one managed resource and to the management application.

15. The method of claim 3, wherein the management application is further configured to monitor health of the at least one managed resource via the management architecture, the second class is used as an object provider base class, the second object comprises an object provider for the at least one managed resource, the object provider is derived from the object provider base class, and the object provider implements management of the at least one managed resource.

16. The method of claim 1, wherein the management application comprises a native management application of the target environment.

17. The method of claim 1, wherein the at least one managed resource is configured to provide a performance metric to the management application via the management architecture, and the performance metric indicates status of the at least one managed resource.

18. The method of claim 1, wherein the management architecture is configured to implement management operations invoked by the management application.

19. The method of claim 18, wherein
the at least one managed resource comprises a lifecycle,
the management operations comprise lifecycle control operations, and
the lifecycle control operations comprise ones of operations related to deployment, installation, start, execution, stop, maintain, and uninstallation of the at least one managed resource.

20. The method of claim 7, wherein
each of the plurality of agents is configured as a respective adapter to communicatively couple the respective one of the at least one managed resource with the management application.

21. The method of claim 20, wherein
each of the at least one managed resource is configured to utilize an information model,
the information model defines data and operations of each of the at least one managed resource,
each of the plurality of agents are configured to utilize a communication model,
the communication model defines operations and protocols to access the information model, and
the management architecture is configured to implement management operations invoked by the management application via the communication model and the information model.

22. The method of claim 7, wherein
the management architecture further comprises a plurality of managers, and
each of the plurality of managers is configured to
aggregate any management information received from the at least one managed resource via the plurality of agents into a decreased quantity of management information, and
forward the decreased quantity of management information to the management application.

23. The method of claim 22, wherein
each of the plurality of managers represents a logical group of a plurality of managed resources, and
the logical group is based on at least one of
physical characteristics of the plurality of managed resources, and
business characteristics of the plurality of managed resources.

24. The method of claim 5, further comprising
deploying the enterprise module from the build environment to the target environment, wherein
the executable application comprises a first collection of computer-executable code that is compiled and linked in the build environment.

25. The method of claim 24, wherein the deploying the enterprise module comprises
providing the enterprise module to the target environment, and
installing the enterprise module in the target environment.

* * * * *